(12) United States Patent
Kozar et al.

(10) Patent No.: US 10,072,126 B2
(45) Date of Patent: Sep. 11, 2018

(54) SOLUBLE NANOPARTICLES FOR COMPOSITE PERFORMANCE ENHANCEMENT

(71) Applicant: The Boeing Company, Chicago, IL (US)

(72) Inventors: Michael P. Kozar, Mercer Island, WA (US); Mark S. Wilenski, Mercer Island, WA (US); Samuel J. Meure, Fishermans Bend (AU)

(73) Assignee: The Boeing Company, Chicago, IL (US)

( * ) Notice: Subject to any disclaimer, the term of this patent is extended or adjusted under 35 U.S.C. 154(b) by 155 days.

(21) Appl. No.: 14/493,367

(22) Filed: Sep. 23, 2014

(65) Prior Publication Data
US 2016/0194459 A1 Jul. 7, 2016

(51) Int. Cl.
| | |
|---|---|
| *C08K 9/10* | (2006.01) |
| *C08J 5/04* | (2006.01) |
| *C08J 5/00* | (2006.01) |
| *C08J 5/24* | (2006.01) |
| *C08L 101/00* | (2006.01) |

(52) U.S. Cl.
CPC ............ *C08J 5/04* (2013.01); *C08J 5/005* (2013.01); *C08J 5/24* (2013.01); *C08K 9/10* (2013.01); *C08L 101/00* (2013.01); *C08J 2300/22* (2013.01); *C08J 2300/24* (2013.01)

(58) Field of Classification Search
CPC ................. C08K 9/10; C08L 101/00
See application file for complete search history.

(56) References Cited

U.S. PATENT DOCUMENTS

| | | | |
|---|---|---|---|
| 3,860,565 A | 1/1975 | Barber, Jr. | |
| 3,943,090 A | 3/1976 | Enever | |
| 4,306,040 A * | 12/1981 | Baer ............ | C08F 291/02 525/310 |
| 4,861,803 A | 8/1989 | Turner | |
| 4,954,195 A | 9/1990 | Turpin | |
| 5,028,478 A | 7/1991 | Odagiri et al. | |
| 5,589,523 A | 12/1996 | Sawaoka | |
| 5,605,745 A | 2/1997 | Recker et al. | |
| 5,618,857 A | 4/1997 | Newberth | |
| 6,503,856 B1 | 1/2003 | Broadway et al. | |
| 6,508,897 B1 | 1/2003 | Yamaguchi | |
| 6,518,330 B2 | 2/2003 | White et al. | |

(Continued)

FOREIGN PATENT DOCUMENTS

| | | |
|---|---|---|
| CN | 101623266 A | 1/2010 |
| EP | 0378854 | 7/1990 |

(Continued)

OTHER PUBLICATIONS

Hydro, et al., Journal of Polymer Science: Part B: Polymer Physics, 45, 1470-1481 (2007).*

(Continued)

*Primary Examiner* — Vickey Nerangis

(57) ABSTRACT

A composition may include a resin and a plurality of polymer nanoparticles in the resin to form a resin mixture. The polymer nanoparticles may be soluble or semi-soluble in the resin. At least partial dissolution of the polymer nanoparticles may result in the alteration of one or more of the properties of the resin.

27 Claims, 17 Drawing Sheets

(56) References Cited

U.S. PATENT DOCUMENTS

| | | | |
|---|---|---|---|
| 6,740,185 B2 | 5/2004 | Baldwin | |
| 6,900,254 B2 * | 5/2005 | Wills | C08F 265/04 523/220 |
| 7,037,865 B1 | 5/2006 | Kimberly | |
| 7,122,250 B2 | 10/2006 | Kinsho et al. | |
| 7,435,693 B2 | 10/2008 | Tsotsis et al. | |
| 7,645,402 B2 | 1/2010 | Choi et al. | |
| 7,655,295 B2 | 2/2010 | Smith et al. | |
| 7,678,847 B2 | 3/2010 | Yan et al. | |
| 7,738,763 B2 | 6/2010 | Ouderkirk | |
| 7,910,636 B2 * | 3/2011 | Barker | C08F 290/067 523/201 |
| 8,080,313 B2 | 12/2011 | Bonneau et al. | |
| 8,088,470 B2 | 1/2012 | Dolby | |
| 8,101,106 B2 | 1/2012 | Ellis | |
| 8,283,404 B2 * | 10/2012 | Allen | B82Y 30/00 427/213.34 |
| 8,288,453 B2 | 10/2012 | Hsu et al. | |
| 8,519,505 B2 | 8/2013 | Hiroshige et al. | |
| 8,703,630 B2 | 4/2014 | LoFaro et al. | |
| 2003/0174994 A1 | 9/2003 | Garito et al. | |
| 2005/0070666 A1 | 3/2005 | Martin | |
| 2005/0255236 A1 | 11/2005 | Deng | |
| 2006/0057355 A1 | 3/2006 | Suzuki et al. | |
| 2006/0269738 A1 | 11/2006 | Kimberly | |
| 2006/0292375 A1 | 12/2006 | Martin | |
| 2007/0248827 A1 | 10/2007 | Rukavina | |
| 2008/0176987 A1 | 7/2008 | Trevet et al. | |
| 2009/0130376 A1 | 5/2009 | Berkel et al. | |
| 2009/0004460 A1 | 6/2009 | Gruber | |
| 2009/0326137 A1 | 12/2009 | Hsu et al. | |
| 2010/0249277 A1 * | 9/2010 | Fang | B82Y 30/00 523/436 |
| 2010/0280151 A1 | 11/2010 | Nguyen | |
| 2010/0304119 A1 | 12/2010 | Bonneau | |
| 2011/0021360 A1 | 1/2011 | Al-Ghamdi | |
| 2011/0028308 A1 | 2/2011 | Shah et al. | |
| 2012/0064283 A1 | 3/2012 | Hill et al. | |
| 2013/0029574 A1 | 1/2013 | Van Der Steen | |
| 2013/0167502 A1 | 7/2013 | Wilson | |
| 2013/0221285 A1 | 8/2013 | Song et al. | |
| 2014/0038481 A1 | 2/2014 | Chen | |
| 2014/0076198 A1 | 3/2014 | Kim et al. | |
| 2014/0295723 A1 | 10/2014 | Nelson | |
| 2015/0025218 A1 | 1/2015 | Gokturk et al. | |
| 2015/0259493 A1 | 9/2015 | Nederkoom | |
| 2016/0083583 A1 * | 3/2016 | Wilenski | C08L 83/04 523/222 |
| 2016/0300810 A1 | 10/2016 | Kanamori | |

FOREIGN PATENT DOCUMENTS

| | | |
|---|---|---|
| EP | 1066224 | 12/2001 |
| EP | 2236549 A1 | 10/2010 |
| EP | 2886590 A1 | 6/2015 |
| WO | WO1999021697 | 5/1999 |
| WO | WO2014073960 | 5/2014 |
| WO | WO2014074767 A1 | 5/2014 |
| WO | WO2015097283 A1 | 7/2015 |

OTHER PUBLICATIONS

European Search Report for EP15186490, dated Jan. 22, 2016.
European Search Report for EP15186484, dated Jan. 22, 2016.
Hackett et al., "The Effect of Nanosilica Concentration on the Enhancement of Epoxy Matrix Resins for Prepreg Composites," Society for the Advancement of Material and Process Engineering, 2010.
Nagavarma et al., "Different Techniques for Preparation of Polymeric Nanoparticles—A Review," Asian Journal of Pharmaceutical and Clinical Research, vol. 5, Suppl 3, 2012.
Sober, D.J., "Kaneka Core-Shell Toughening Systems for Thermosetting Resins," 2007.
Suzuki, M.; Nagai, A.; Suzuki, M., Takahashi, A.: "Relationship between Structure and Mechanical Property for Bismaleimide-Biscyanamide resin," 1992. J. App. Poly. Sci, 45, pp. 177-180.
Fan, H.; Lei, Z.; Pan, J.H.; Zhao, X.S., "Sol-gel synthesis, microstructure and adsorption properties of hollow silica spheres," Materials Letters 65 (2011), 1811-1814.
State Intellectual Property Office of PRC, Chinese Office Action dated Dec. 26, 2016 for Appln. No. 201380052712.1.
Diaz, Jairo et al. Thermal Expansion of Self-Organized and Shear-Oriented Cellulose Nanocrystal Films, Biomacromolecules, 2013 14(8), pp. 2900-2908. published online Jul. 10, 2013.
European Office Action for EP15186484, dated Apr. 28, 2017.
EPO, Examination Report for Appl. No. 15186484.0, dated Oct. 31, 2017.
Malvern, "A basic guide to particle characterization," dated 2015, pp. 1-23, Malvern Instruments Limited, Worcestershire, UK.
EPO, Examination Report for Appl. No. 15186484.0, dated Apr. 3, 2018.
Fu et al., "Effects of particle size, particle/matrix interface adhesion and particle loading on mechanical properties of particulate-polymer composites," Composites Part B: Engineering, vol. 39, Issue 6, pp. 907-1068, Sep. 2008.
Salviato et al., "Nanoparticle debonding strength: A comprehensive study on interfacial effects," International Journal of Solids and Structures, vol. 50, Issues 20-21, pp. 3225-3232, Oct. 1, 2013.

\* cited by examiner

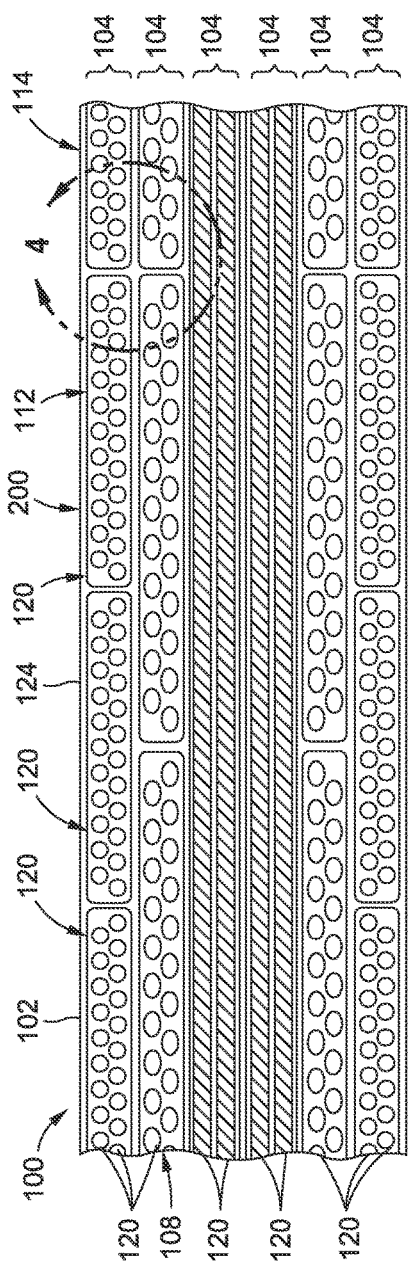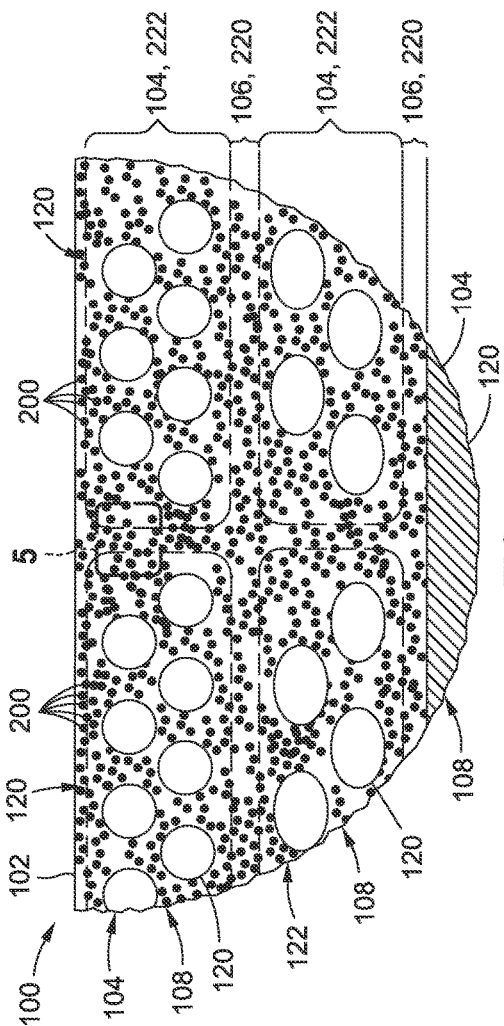

SOLUBLE NANOPARTICLES FOR COMPOSITE PERFORMANCE ENHANCEMENT

FIELD

The present disclosure relates generally to composite materials and, more particularly, to the use of nanoparticles in composite structures.

BACKGROUND

The manufacturing of a composite structure may include applying uncured resin to reinforcing fibers of a composite layup. The temperature of the composite layup may be increased to reduce the viscosity of the resin so that the resin may flow and infuse into the fibers. The composite layup may be held at an elevated temperature for a predetermined period of time to cure the resin into a solidified or hardened state. After the resin has cured, the composite structure may be passively or actively cooled to ambient temperature.

In many composite material systems, the resin may have a coefficient of thermal expansion (CTE) that may be different than the CTE of the reinforcing fibers. For example, epoxy resins may have a CTE that may be an order of magnitude greater than the CTE of carbon fibers. The difference in CTE may result in the resin and fibers contracting by different amounts as the composite structure cools down from the curing temperature. The difference in contraction of the resin relative to the fibers may result in thermally-induced stresses in the resin. The thermally-induced stresses may result in undesirable microcracking in the resin. Microcracking may also occur during the service life of a composite structure due to changes in temperature of the operating environment of the composite structure. In addition, microcracking may occur near the outer regions of a composite structure in response to impact with an object.

Prior art attempts to reduce or prevent microcracking include the addition of tougheners to liquid resin. Conventional thermoset resins may be formed using liquid polymers to form an uncured liquid resin. Alternatively, solid polymers may be dissolved into liquids during mixing to form an uncured liquid resin. Tougheners in liquid or solid form may be added to the uncured liquid resin to improve the resistance of the resin to microcracking. Unfortunately, adding tougheners to resin may result in a reduction in the final resin glass transition temperature during curing, or the tougheners may increase the cure temperature of the resin and/or cause excessive cure shrinkage of the resin.

In addition, tougheners often increase the viscosity of the resin which may impair manufacturability and thus effectively limit the amount of toughener that can be added to the resin. Advanced thermoset resins typically require relatively high cure temperatures (e.g., 350-600° F.) to fully cure the thermoset resin/composite. Such high cure temperatures may result in increased thermally-induced stresses and strains due to the differential CTE between the fibers and resin.

As can be seen, there exists a need in the art for a system and method for improving the toughness and other properties of a resin such as for a composite structure.

SUMMARY

The above-noted needs associated with resins are specifically addressed by the present disclosure which provides a composition that may include a resin containing a plurality of polymer nanoparticles to form a resin mixture. The polymer nanoparticles may be soluble or semi-soluble in the resin. The full or partial dissolution of the polymer nanoparticles may result in the alteration of one or more of the properties of the resin mixture.

Also disclosed is a composite structure which may include a resin, a plurality of polymer nanoparticles in the resin to form a resin mixture, and a plurality of reinforcing fibers embedded within the resin mixture. At least a portion of the polymer nanoparticles may be soluble or semi-soluble in the resin may result in or cause an improvement in one or more of the properties of the resin and/or the composite structure.

Additionally disclosed is a method of manufacturing a composition. The method may include mixing soluble and/or semi-soluble polymer nanoparticles into a resin to form a resin mixture. The method may additionally include curing the resin mixture, and at least partially dissolving the polymer nanoparticles in the resin prior to or during the curing of the resin.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 shows a cross-section of a portion of a composite structure showing reinforcing filaments of the unidirectional plies oriented at different angles;

FIG. 4 is an enlarged view of a portion of the composite structure taken along line 4 of FIG. 3 and showing a plurality of polymer nanoparticles in the resin;

FIG. 10A is a schematic illustration of the cured resin mixture of FIG. 10 after dissolution of the sheaths such that the shaped particles remains in the resin;

DETAILED DESCRIPTION

Figure 1:
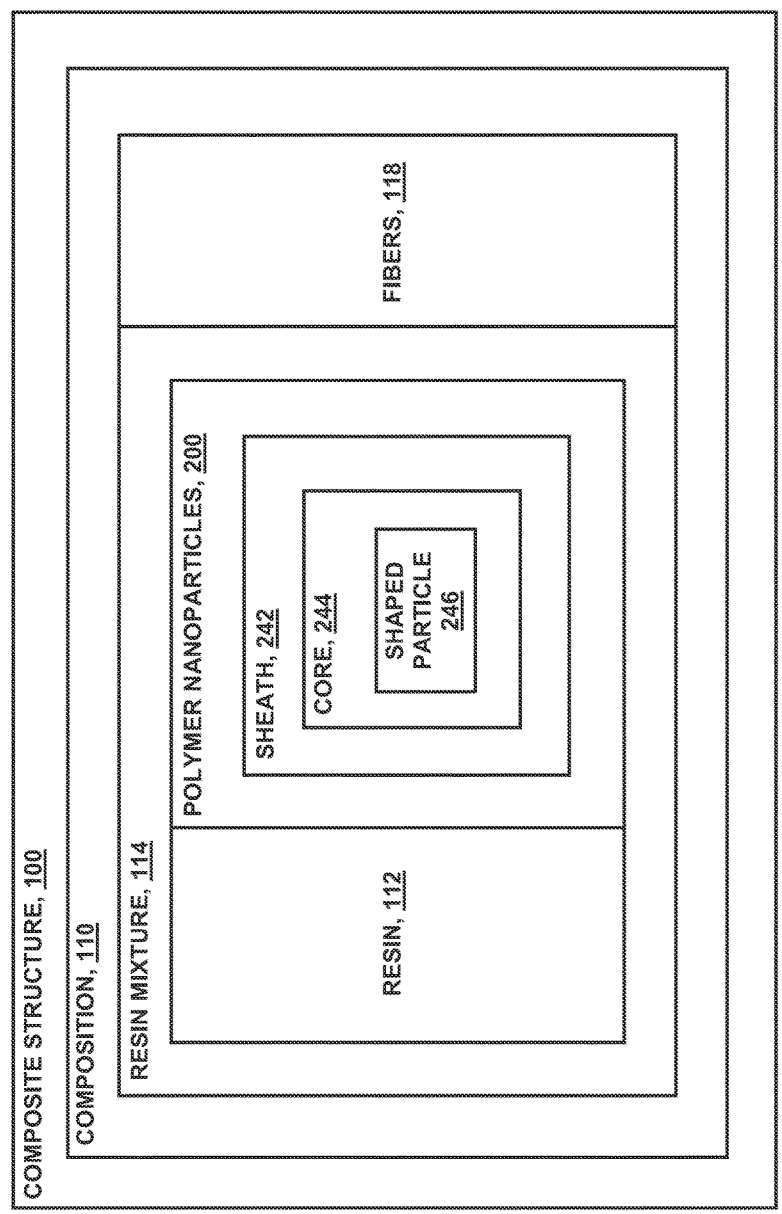
FIG. 1 is a block diagram of a composite structure including reinforcing fibers and a resin mixture comprising resin containing polymer nanoparticles.

Referring now to the drawings wherein the showings are for purposes of illustrating various embodiments of the disclosure, shown in FIG. 1 is a block diagram of a composite structure 100 including a composition 110. The composition 110 may include a resin mixture 114. In some examples, the composition 110 may include further include reinforcing fibers 118. The reinforcing fibers 118 may be made up of a plurality of reinforcing filaments 120. The resin mixture 114 may include resin 112 containing polymer nanoparticles 200. The polymer nanoparticles 200 may be soluble or semi-soluble in the resin 112. In some examples, the polymer nanoparticles 200 may be fully-soluble in the resin 112. In other examples, the polymer nanoparticles 200 may be partially soluble in the resin 112. The dissolved portion of the polymer nanoparticles 200 may be cured or solidified during the resin cure or solidification cycle.

The dissolution of the fully-soluble or semi-soluble polymer nanoparticles 202 (FIG. 5), 204 in the resin 112 may result in an improvement in the properties of the resin 112 and/or an improvement in the properties or performance of a composite structure 100 manufactured with the resin 112 (FIG. 2) containing the polymer nanoparticles 200. For example, the partial or complete dissolution of polymer nanoparticles 200 in the resin 112 may result in an increase in the toughness of the resin 112 in one or more regions of the resin 112 or in one or more regions of a composite structure 100 (FIG. 2) containing the resin 112. An increase in the toughness of the resin 112 may reduce or prevent crack (not shown) initiation or growth within the resin 112. In other examples, the partial or complete dissolution of polymer nanoparticles 200 in the resin 112 may result in increased flammability resistance and/or reduced smoke and/or toxicity of the resin 112 and/or of a composite structure 100. Additional improvements that may be provided by addition of the polymer nanoparticles 200 to the resin 112 may include increased corrosion resistance, increased electrical conductivity, reduced cure-shrinkage-related distortion, reduced heat-of-reaction-related resin degradation, reduced cure-shrinkage-related distortion, improved modulus of elasticity, and an increase in the strength and/or strain properties of resin 112 or in a composite structure 100 containing the resin 112.

Figure 2:
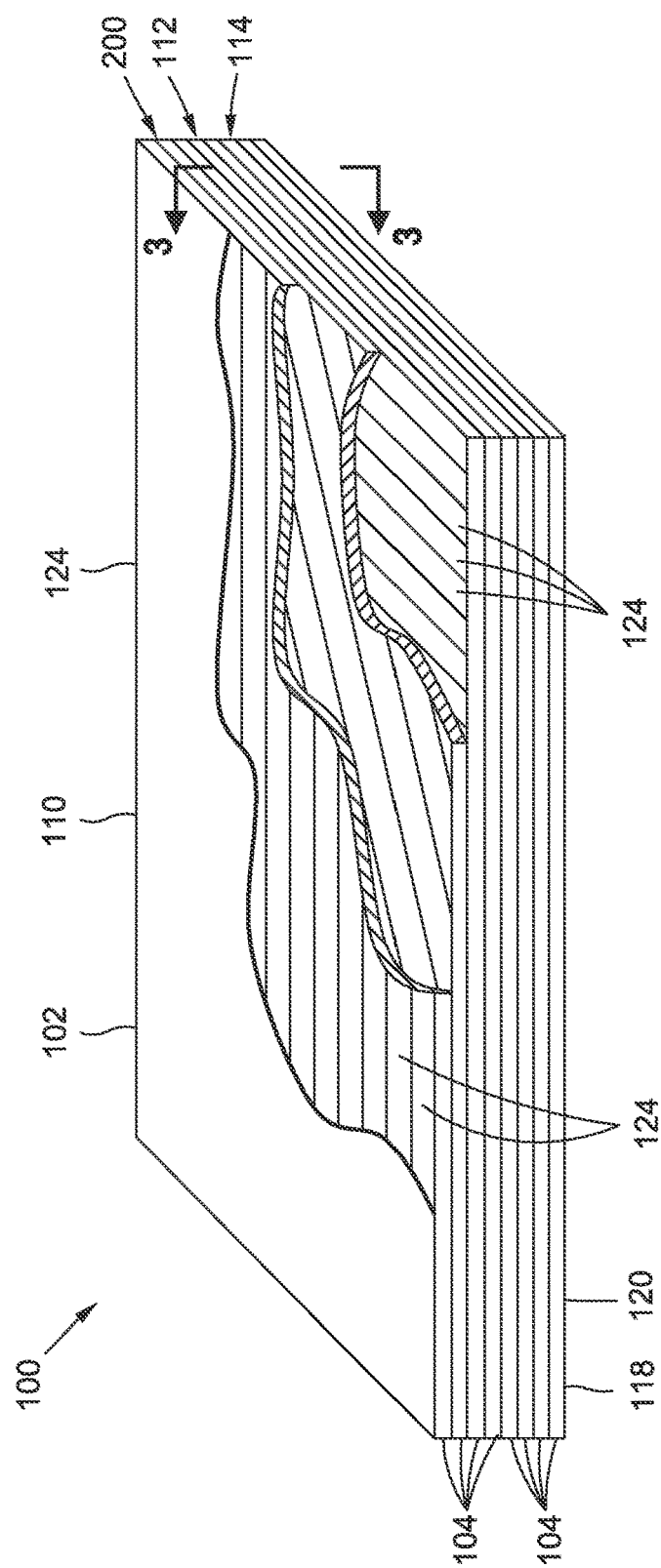
FIG. 2 is a perspective view of a composite structure including a stack of unidirectional plies each formed of a plurality of continuous reinforcing fibers.

The polymer nanoparticles 200 may also cause one or more properties of a resin 112 or composite structure 100 to be non-isotropic. In this regard, dissolution of polymer nanoparticles 200 in a resin 112 (FIG. 2) may cause the toughness, coefficient of thermal expansion (CTE), stiffness (e.g., modulus), strength, conductivity (electrical or thermal), and/or failure strain of the resin 112 to have different values along different directions of the resin 112. For example, dissolution of polymer nanoparticles 200 (FIG. 2) may result in the modulus or failure strain of the resin 112 to be higher along a direction transverse to reinforcing fibers 118 relative to the modulus or failure strain of the resin 112 along a direction non-transverse to reinforcing fibers 118 (FIG. 2). Advantageously, the polymer nanoparticles 200 may be provided in a wide range of materials which may allow for the ability to alter or improve the properties of the resin 112 and/or composite structure 100 over wide range of property values.

In addition, the polymer nanoparticles 200 may be provided in a relatively small size which may allow the resin mixture 114 (FIG. 5) to retain a relatively low viscosity even at high load levels of the polymer nanoparticles 200 in the resin 112. For example, the polymer nanoparticles 200 may be provided in a cross-sectional width 206 (FIG. 5) or particle diameter of approximately 10-200 nanometers. In some examples, the polymer nanoparticles 200 may have a cross-sectional width 206 of between 10-100 nanometers. Advantageously, a relatively small cross-sectional width of the polymer nanoparticles 200 may prevent the reinforcing filaments 120 or fibers 118 (FIG. 2) from filtering out overly-large nanoparticles such as during prepregging operations or during the process of infusing resin 112 into the fibers 118 of a composite layup 102 (FIG. 2). In this regard, an overly-large cross-sectional width of the polymer nanoparticles 200 may prevent passage of the polymer nanoparticles 200 between adjacent reinforcing filaments 120 and/or between adjacent fiber tows. In some examples, the polymer nanoparticles 200 may be provided in different cross-sectional widths or diameters which may enable different volumetric ratios of resin-to-nanoparticles within a resin mixture 114 or within a composite layup 102.

The polymer nanoparticles 200 may be provided in a generally rounded or spherical shape to retain a relatively low viscosity at high polymer nanoparticle load levels, and to avoid interlocking of nanoparticles with other nanoparticles or with fibers 118 or filaments 120 (FIG. 2) as may otherwise occur with non-spherical or complexly-shaped nanoparticles that have sharp edges or corners. The polymer nanoparticles 200 may be configured to retain their rounded or spherical shape up to a certain point during the cure cycle and/or prior to complete or partial dissolution of the polymer nanoparticles 200 in the resin 112. For example, the polymer nanoparticles 200 (FIG. 2) may retain their rounded or spherical shape at least up to the glass transition temperature of the resin 112 and/or below the cure temperature of the resin 112.

Advantageously, by retaining their generally rounded or spherical shape below a predetermined temperature, the polymer nanoparticles 200 may remain entrained within the resin mixture 114 (FIG. 2) as the resin flows through and infuses a composite layup 102. It should be noted that the polymer nanoparticles 200 are not limited to generally rounded or spherical shapes. For example, polymer nanoparticles 200 (FIG. 2) may be provided in an oblong or elliptical shape, or in three-dimensional shapes such as cylinders, tube, cubes, rectangles, pyramids, and other shapes. The relatively small cross-sectional width 206 (FIG. 5) and/or the generally rounded shape (e.g., spherical) of the polymer nanoparticles 200 may allow for a relatively high concentration of polymer nanoparticles 200 within the resin 112 with a relatively small increase in resin viscosity.

In some examples, the polymer nanoparticles 200 may constitute up to 75 percent by volume of a resin mixture 114 containing resin 112 and polymer nanoparticles 200. Preferably, the polymer nanoparticles 200 may constitute a minimum of 10 percent by volume of a resin mixture 114 as the low end of a range of volumetric percentage of polymer nanoparticles 200. However, in some examples, the polymer nanoparticles 200 may constitute no less than 5 percent by volume at the low end of the range. In still other examples, the polymer nanoparticles 200 may constitute no less than 10 percent by volume of the resin mixture 114 at the low end of the range. In further examples, the polymer nanoparticles 200 may constitute no less than 15 percent by volume at the low end of the range.

In certain applications, it may be desirable to provide the polymer nanoparticles 200 at a maximum of 65 percent by volume of a resin mixture 114 as a high end of a range of percentage by volume of polymer nanoparticles 200. However, in some examples, the polymer nanoparticles 200 may constitute no more than 50 percent by volume as the high end of the range. In certain applications, polymer nanoparticles 200 may be provided in any combination of the above-mentioned low end and high end of the range of volumetric percentage of polymer nanoparticles 200 of a resin mixture 114. Non-limiting examples of combinations of the above-mentioned low end and high end of a range of percentage by volume of polymer nanoparticles 200 include an arrangement wherein the polymer nanoparticles 200 constitute from 5-75 percent by volume of a resin mixture 114. Another example may include polymer nanoparticles 200 that constitute from 10-75 percent by volume of a resin mixture 114. In still other examples, the polymer nanoparticles 200 may constitute from 15-65 percent by volume of a resin mixture 114. In an even further example, the polymer nanoparticles 200 may constitute from 20-50 percent by volume of a resin mixture 114. Advantageously, the generally rounded or spherical shape of the polymer nanoparticles 200 allows for linear improvements in the resin 112 properties with linear increases in the concentration level of polymer nanoparticles 200 in the resin 112 with minimal or negligible effect on resin viscosity.

The polymer nanoparticles 200 may be included in a resin mixture 114 for any one of a variety of different applications including, but not limited to, adhesives, coatings, plastics for injection molding, a resin for fiber-reinforced composite structures 100 (FIG. 2), and other applications. The polymer nanoparticles 200 (FIG. 2) may be included in thermosetting resins 112 and in thermoplastic resins 112. In addition, the polymer nanoparticles 200 may be used in pre-impregnated fiber-reinforced layups and in dry fiber layups. The polymer nanoparticles 200 may also be used in a variety of resin systems including, but not limited to, resin film infusion, vacuum assisted resin transfer molding, and other systems for infusing dry fiber preforms 124 (FIG. 2) with resin 112.

FIG. 2 shows a composite structure 100 made up of a stack of composite plies 104. In the example shown, each one of the composite plies 104 may be a unidirectional ply 108. Each one of the unidirectional plies 108 (FIG. 3) may include a plurality of parallel, continuous reinforcing fibers 118 or fiber tows which may be configured as unidirectional tape 122 or unidirectional sheet. Each one of the fiber tows may be made up of a bundle of several thousand reinforcing filaments 120. For example, a single fiber tow may include up to 100,000 or more reinforcing filaments 120. In some examples, a reinforcing filament may have a filament cross-sectional width or diameter of 5-30 microns. For example, a carbon reinforcing filament may have a filament cross-sectional width of approximately 5-7 microns. Glass reinforcing filaments may have a filament cross-sectional width of 10-25 microns. In the present disclosure, the terms reinforcing fiber, fiber tow, and composite fiber may be used interchangeably. Reinforcing fibers 118 for use in a composite layup 102 (FIG. 3) may be provided in any one of a variety of different fiber forms, and are not limited to unidirectional tape 122 or unidirectional sheet. For example, a composite structure 100 may be formed of composite plies 104 (FIG. 3) configured as woven fabric, braided fibers, stitched fiber forms, chopped fibers in fiber mats, and any one of a variety of crimp and non-crimp fiber forms.

The composite structure 100 of FIG. 2 may be formed by stacking dry fiber composite plies 104 which may be later infused with resin 112. For example, a liquid resin mixture 114 (FIG. 2) containing polymer nanoparticles 200 may be infused into a dry fiber composite layup 102 after which heat and/or pressure may be applied to consolidate and cure or solidify the composite layup 102 (FIG. 3) to form a composite structure 100. In some examples, the dry fiber composite layup 102 may be infused with unmodified resin. In the present disclosure, unmodified resin may be described as resin 112 that does not contain polymer nanoparticles 200, or is devoid of polymer nanoparticles 200.

After infusing the composite layup 102 with unmodified resin, polymer nanoparticles 200 may be applied to one or more locations of the composite layup 102 prior to consolidating and curing or solidifying the composite layup 102 (FIG. 3) to form a composite structure 100. For example, a solution of polymer nanoparticles 200 may be uniformly applied throughout a composite layup 102. Alternatively, polymer nanoparticles 200 may be provided in a higher concentration in a first region 220 (FIG. 4) of a resin mixture 114 or composite structure 100, and a lower concentration of polymer nanoparticles 200 in a second region 222 (FIG. 4) of the resin mixture 114 or composite structure 100. In this manner, the resin mixture 114 or composite structure 100 may have different properties in the first region 220 relative to the properties of the resin mixture 114 (FIG. 2) or composite structure 100 in the second region 222. The types of properties that may be different in a first region 220 relative to a second region 222 may include toughness, modulus, strength, failure strain, coefficient of thermal expansion (CTE), flammability resistance, smoke and toxicity levels, electrical conductivity, corrosion resistance, cure shrinkage, heat of reaction, and other properties.

For example, a solution of polymer nanoparticles 200 may be applied to increase the resin toughness in specific locations of a composite layup 102, such as in the interlaminar regions 106 between selected composite plies 104 (FIG. 2), and/or between opposing side edges of fiber tows or tape of one or more composite plies 104, while remaining regions of a composite structure 100 may be devoid of polymer nanoparticles 200. In some examples, a solution of polymer nanoparticles 200 (FIG. 2) may be applied to resin-rich pockets of a composite layup 102. Resin-rich pockets may be described as high-resin-content locations in a composite layup 102 (FIG. 2), or locations that have a large volume of resin relative to the volume of fibers. A resin mixture 114 containing polymer nanoparticles 200 may be infused into a dry fiber composite layup 102 such that the polymer nanoparticles 200 are substantially uniformly distributed in bulk throughout the composite layup 102.

Advantageously, the relatively small size of the fully-soluble or semi-soluble polymer nanoparticles 202, 204 allows for substantially uniform dispersion of the dissolved nanoparticle material within the resin at the location each nanoparticle. More specifically, the relatively small size of the nanoparticles (e.g., 10-200 nm) results in a relatively short path length (e.g., on the order or nanometers) for the dissolved nanoparticle material to mix with the resin at the (former) location of each nanoparticle. For example, in arrangements where fully-soluble or semi-soluble polymer nanoparticles 202, 204 are uniformly dispersed throughout a composite layup, the small size of the nanoparticles 202, 204 results in substantially uniform distribution of the dissolved nanoparticle material within the resin throughout the composite layup resulting in uniformity in the improved properties of the resin throughout the composite structure. Likewise, in arrangements were fully-soluble or semi-soluble polymer nanoparticles 202, 204 are locally applied to targeted regions such as between composite plies, between opposing side edges of side-by-side fiber tows, and/or in resin-rich pockets, the small size of the nanoparticles 202, 204 allows for a substantially uniform distribution of the dissolved nanoparticle material within the resin at the targeted regions and resulting in uniformity in the improved properties of the resin and/or composite structure at such targeted regions.

A composite structure 100 may also be formed by laying up a stack of composite plies 104 that may be pre-impregnated (e.g., prepreg composite plies) with a resin mixture 114 containing polymer nanoparticles 200. After laying up the stack of prepreg composite plies, heat and/or pressure may be applied to consolidate and cure or solidify the composite layup 102 to form a composite structure 100. In other examples, the prepreg composite plies may be pre-impregnated with unmodified resin, and polymer nanoparticles 200 may be selectively applied to target regions of a composite layup 102 (FIG. 2) such as the above-mentioned high-resin-content locations of a composite layup 102. Alternatively, the polymer nanoparticles 200 may be substantially uniform distributed in bulk throughout a composite layup 102. For example, a solution of polymer nanoparticles 200 (FIG. 2) may be applied uniformly throughout the composite layup 102, or in selected areas of the composite layup 102. Even further, a film of resin (not shown) containing polymer nanoparticles 200 may be laid up between one or more dry fiber composite plies 104 (FIG. 2) or between one or more prepreg composite plies of a composite layup 102. Polymer nanoparticles 200 may also be applied to reinforcing filaments 120 during manufacturing and/or prepregging of the reinforcing filaments 120.

In any one of the examples disclosed herein, the resin 112 and/or polymer nanoparticles 200 (FIG. 2) may be formed from thermoplastic material and/or thermosetting material. Thermoplastic material may include at least one of the following: acrylics, fluorocarbons, polyamides, polyolefins (e.g., polyethylenes, polypropylenes), polyesters, polycarbonates, polyurethanes, polyaryletherketones (e.g., polyetheretherketone (PEEK), polyetherketoneketone (PEKK), polyetherketoneetherketone (PEKEK)), etc.), and polyetherimides. Thermosetting material may include at least one of the following: polyurethanes, phenolics, polyimides, sulphonated polymer (polyphenylene sulphide), a conductive polymer (e.g., polyaniline), benzoxazines, bismaleimides, cyanate esthers, polyesters, epoxies, and silsesquioxanes. The reinforcing filaments 120 or reinforcing fibers 118 may be formed from materials such as carbons, silicon carbide, boron, ceramic, and metallic material. The reinforcing filaments 120 or fibers 118 (FIG. 2) may also be formed from glass such as E-glass (alumino-borosilicate glass), S-glass (alumino silicate glass), pure silica, borosilicate glass, optical glass, and other glass compositions.

A resin mixture 114 may contain polymer nanoparticles 200 formed of two different materials. In this regard, some of the polymer nanoparticles 200 in a resin mixture 114 may have a different material composition than other polymer nanoparticles 200 in the same resin mixture 114. The different materials of the polymer nanoparticles 200 may provide a means for altering the properties of the resin 112 (FIG. 2) and/or composite structure 100 in different ways, as described below. In another example, some of the polymer nanoparticles 200 in a resin mixture 114 may be core-sheath nanoparticles 240 having a sheath 242 encapsulating a core 244 (FIG. 8). The core 244 may have a material composition that may be different than the material composition of the sheath 242. In some examples, the core 244 may have a spherical shape with a cross-sectional width of 10-200 nanometers. In some examples, the core 244 may be a shaped particle 246 or a non-spherical particle, as described below.

FIG. 3 shows a cross-section of a portion of the composite structure 100 of FIG. 2, and illustrating the reinforcing filaments 120 that make up the fibers 118 or unidirectional tape 122 of the composite plies 104. In the example shown, the reinforcing filaments 120 in the uppermost and lower-most composite plies 104 are oriented along a direction perpendicular to the plane of the paper. The middle two composite plies 104 of the composite layup 102 in FIG. 3 include reinforcing filaments 120 that are oriented parallel to a plane the paper. The composite plies 104 located between the middle and uppermost composite ply 104 and between the middle and lowermost composite ply 104 contain reinforcing filaments 120 oriented non-parallel and non-perpendicular to the plane of the paper. However, the reinforcing filaments 120 in any one of the composite plies 104 may be arranged in any orientation, without limitation.

FIG. 4 shows a portion of the composite structure 100 of FIG. 3 and illustrating the plurality of polymer nanoparticles 200 substantially uniformly dispersed throughout the resin mixture 114. As indicated above, the composite plies 104 may be formed of pre-impregnated unidirectional tape 122 containing polymer nanoparticles 200. After layup of the composite plies 104, heat and/or pressure may be applied to reduce the viscosity of the pre-impregnated resin 112, allowing the resin 112 (FIG. 3) to flow and intermingle with the resin 112 of adjacent composite plies 104 such that the polymer nanoparticles 200 may become substantially uniformly distributed throughout the composite layup 102. However, as indicated above, a composite layup 102 may be formed of composite plies 104 that may be pre-impregnated with unmodified resin. Polymer nanoparticles 200 may be applied to specific locations of the composite layup 102 such as by spraying a solution on resin-rich pockets associated with the composite layup 102. For example, polymer nanoparticles 200 may be applied to the interlaminar regions 106 between one or more pairs of adjacent composite plies 104. In another example, polymer nanoparticles 200 may be applied between the side edges of adjacent fibers 118 or tapes of a composite layup 102.

In still other examples, polymer nanoparticles 200 may be applied in a manner such that the nanoparticles are predominately located within a fiber bed, and the remainder of the composite layup 102 (FIG. 4) such as the interlaminar regions 106 may be devoid of polymer nanoparticles 200. Further in this regard, polymer nanoparticles 200 may be selectively applied to one or more of the outer surfaces (not shown) of a composite layup 102 to provide targeted functionality. For example, polymer nanoparticles 200 (FIG. 4) may be applied to the external surfaces or regions of a composite layup 102 that may interface with a metallic component (not shown). In some examples, the polymer nanoparticles 200 may include tougheners that may improve the impact resistance of the outer region of a composite structure 100 (FIG. 4), or the polymer nanoparticles 200 may reduce or prevent fatigue-induced propagation of microcracks (not shown) that may occur near the outer regions of a composite structure 100 in response to impact with an object. Polymer nanoparticles 200 may also be applied to other locations of a composite layup 102 to improve the resistance to initiation or propagation of microcracks in the resin 112.

In an example not shown, polymer nanoparticles 200 may be applied to woven fabric (not shown) or braided fibers (not shown) such as in resin-rich pockets at the divots (not shown) formed at the intersections of intersecting fiber tows of woven fabric or braided fibers. Even further, polymer nanoparticles 200 may be selectively applied to certain regions of a composite layup 102 (FIG. 4) such as thicker sections (e.g., containing a larger quantity of composite plies 104) of a composite layup 102, while thinner sections of a composite layup 102 (e.g., containing a smaller quantity of composite plies 104) may be devoid of polymer nanoparticles 200. As described below, selectively applying polymer nanoparticles 200 may locally increase the toughness of the resin 112 (FIG. 3) at the location of the polymer nanoparticles 200 which may prevent or reduce crack growth or crack initiation at such locations. By reducing the propensity for crack growth or crack initiation in one or more locations of a composite structure 100, the load-carrying capability of the composite structure 100 (FIG. 4) may be increased which may allow for a reduction in the structural mass of the composite structure 100. A reduction in the structural mass may provide performance advantages. In the case of an aircraft, a reduction in structural mass may correspond to an increase in fuel efficiency, range, payload capacity, or other performance improvements.

Figure 5A:
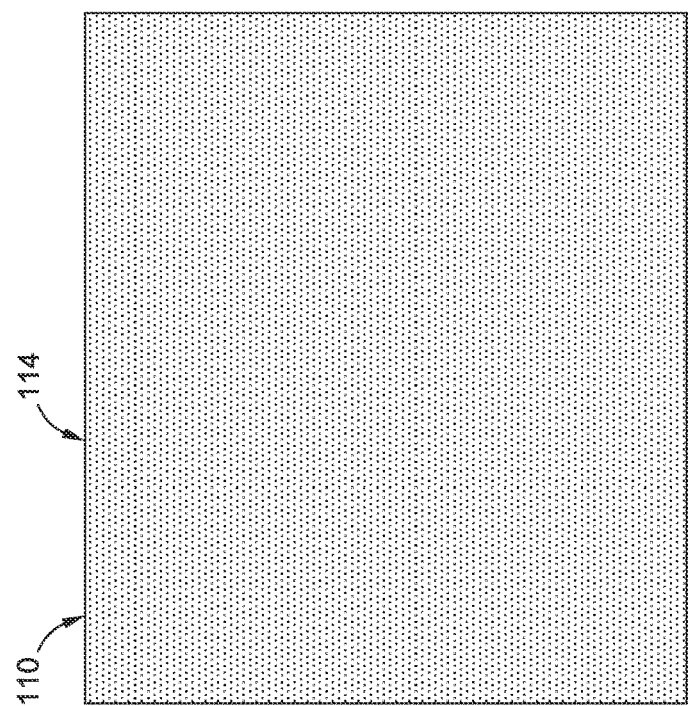
FIG. 5A is a schematic illustration of the cured resin mixture of FIG. 5 showing substantially complete dissolution of the fully-soluble polymer nanoparticles into the resin.
Figure 5:
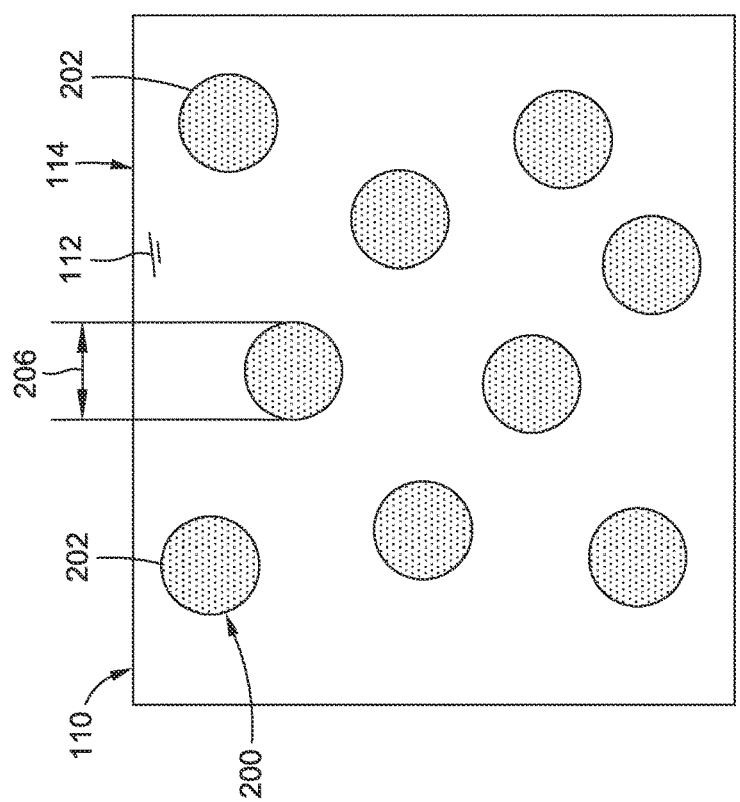
FIG. 5 is a schematic illustration of an uncured resin mixture taken along line 5 of FIG. 4 and illustrating a plurality of fully-soluble polymer nanoparticles in the resin mixture.

FIG. 5 is a schematic illustration of an uncured resin mixture 114 containing a controlled number of polymer nanoparticles 200. In the example shown, the polymer nanoparticles may be fully-soluble 202 in the resin 112. The fully-soluble polymer nanoparticles 202 may be substantially uniformly disbursed within the resin 112 such that the viscosity of the resin mixture 114 is controlled by the viscosity of the resin 112. However, for any one of the polymer nanoparticle configurations disclosed herein, different areas of a composite layup 102 may be provided with different load levels of polymer nanoparticles 200. For example, polymer nanoparticles 200 may be applied only to resin-rich pockets of a composite layup 102, as indicated above. Alternatively, polymer nanoparticles 200 may be applied in different load levels at different location along the length, width, and/or thickness of a composite layup 102.

FIG. 5A is a schematic illustration of the cured resin mixture 114 of FIG. 5 showing the substantially complete dissolution of the fully-soluble polymer nanoparticles 202 into the resin 112, and resulting in a generally homogenous composition 110 of resin 112 (FIG. 5) and dissolved polymer nanoparticle material. In some examples, the fully-soluble polymer nanoparticles 202 may remain in a solid state below a predetermined temperature of the resin 112 and/or for a predetermined period of time, and may dissolve in the resin 112 above the predetermined temperature and./or after a predetermined period of time. For example, any one of the polymer nanoparticles 200 (FIG. 5) disclosed herein may be configured to retain a substantially rounded or spherical shape during resin flow and/or infusion through the composite layup 102, and the polymer nanoparticles 200 may dissolve after the majority of the resin flow has occurred. The point at which the polymer nanoparticles 200 dissolve may be controlled by tailoring the solubility of the polymer nanoparticle material composition, and/or by tailoring the cure cycle such as the hold time(s) and associated temperature(s) of the cure cycle.

As a result of the substantially complete dissolution of the fully-soluble polymer nanoparticles 202, the properties of the resin 112 may be improved, as indicated above. The type of properties that may be improved in the resin 112 (FIG. 5) may depend upon the material composition of the polymer nanoparticles 200. For example, the full dissolution of fully-soluble polymer nanoparticles 202 may result in a substantially uniform increase in the toughness of the resin 112 which may advantageously reduce or prevent crack initiation or crack growth within the resin 112. Other properties that may be improved upon dissolution of the fully-soluble polymer nanoparticles 202 (FIG. 5) may include increased flammability resistance, reduced smoke, reduced toxicity of the resin 112 and/or composite structure 100. The dissolution of the fully-soluble polymer nanoparticles 202 may also result in increased electrical conductivity, reduced cure-shrinkage-related distortion, reduced heat-of-reaction-related distortion, and reduced heat-of-reaction-related resin degradation in the final composite structure 100.

Figure 6A:
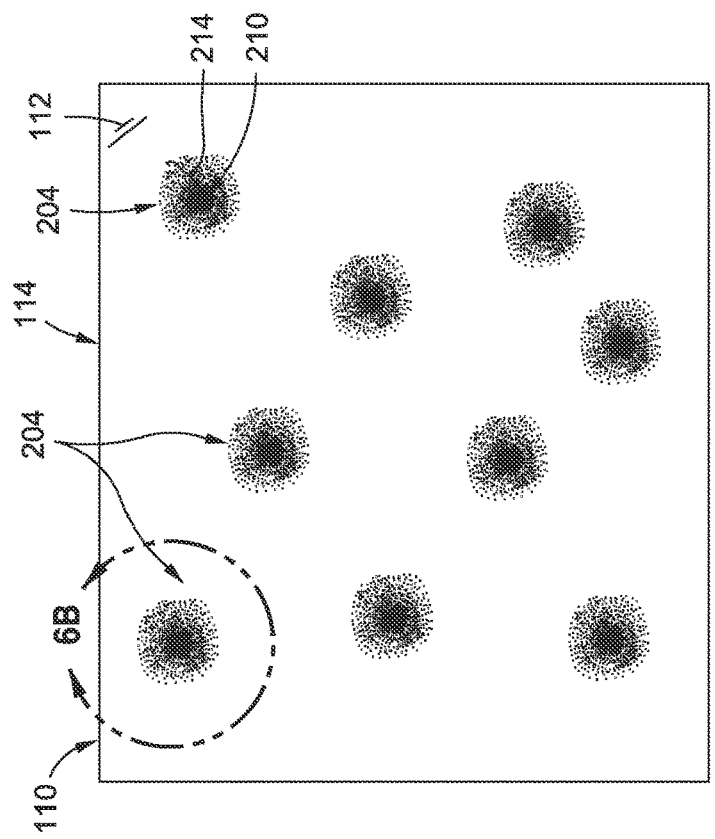
FIG. 6A is a schematic illustration of the cured resin mixture of FIG. 6 showing the partial dissolution of the semi-soluble polymer nanoparticles in the resin.
Figure 6:
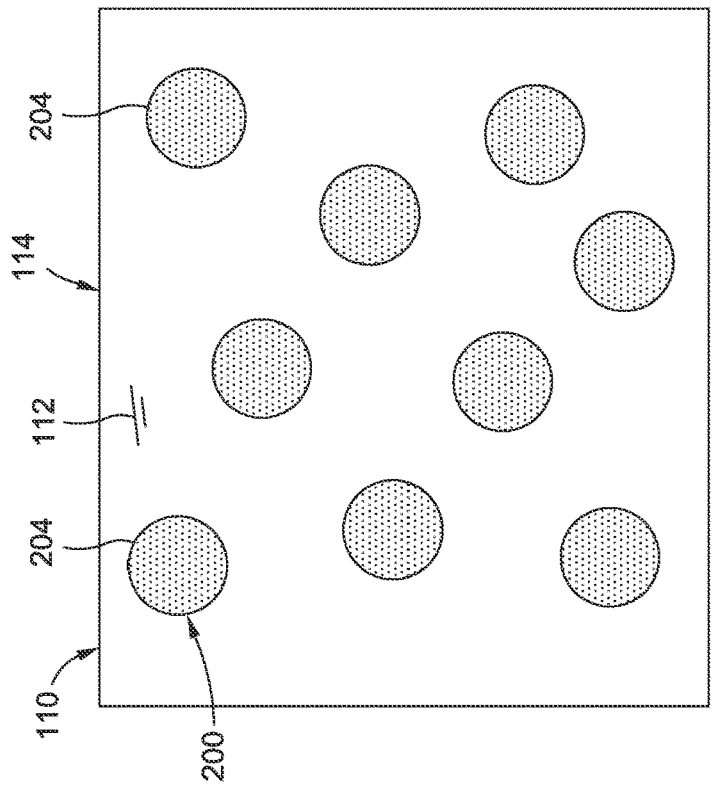
FIG. 6 is a schematic illustration of an uncured resin mixture showing a plurality of semi-soluble polymer nanoparticles in the resin mixture.

FIG. 6 is a schematic illustration of an uncured resin mixture 114 containing a plurality of semi-soluble polymer nanoparticles 204. As indicated above, the quantity of polymer nanoparticles 200 in the resin 112 may be controlled to provide a precisely-controlled concentration level of polymer nanoparticles 200 in the resin 112. As in the fully-soluble polymer nanoparticles 202 shown in FIG. 5, the semi-soluble polymer nanoparticles 204 in FIG. 6 may be substantially uniformly disbursed within the resin 112. The semi-soluble polymer nanoparticles 204 may be configured to remain in a solid state and thereby retain their spherical shape below a predetermined temperature of the resin 112. For example, in any the embodiments disclosed herein, the semi-soluble or fully-soluble polymer nanoparticles 202, 204 may be configured to remain in a solid state below the glass transition temperature of the resin 112, such that the polymer nanoparticles 200 may remain entrained within the resin 112 during the majority of the time that the resin 112 is flowing within the composite layup 102.

FIG. 6A is a schematic illustration of the cured resin mixture 114 of FIG. 6 showing the partial dissolution of the semi-soluble polymer nanoparticles 204 into the resin 112. The semi-soluble polymer nanoparticles 204 may be configured to partially dissolve in the resin 112 above a predetermined temperature such as above the glass transition temperature of the resin 112. The point during the curing cycle when the semi-soluble polymer nanoparticles 204 start to dissolve may be controlled by the material composition of the semi-soluble polymer nanoparticles 204, or by controlling the curing process parameters such as the temperature and time associated with the curing cycle. The partial dissolution of the semi-soluble polymer nanoparticles 204 may result in a gradient 214 of properties around the location of each one of the semi-soluble polymer nanoparticles 204.

Figure 6B:
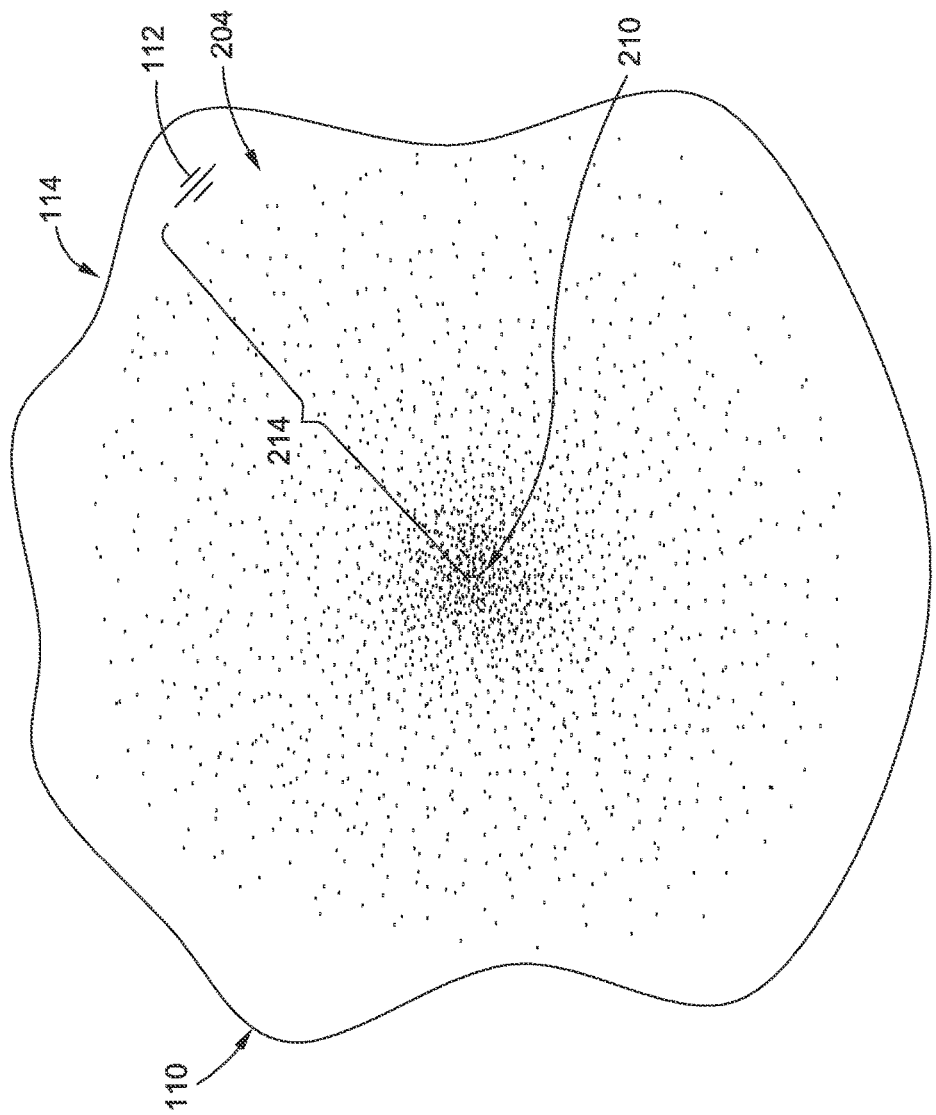
FIG. 6B is a schematic illustration of a semi-soluble polymer nanoparticle of FIG. 6A and schematically illustrating a gradient of toughness extending from a particle center toward the base resin surrounding the semi-soluble polymer nanoparticle.

FIG. 6B schematically illustrates a semi-soluble polymer nanoparticle 204 of FIG. 6A and shows a gradient 214 of one or more properties extending from a particle center 210 toward the cured base resin 112 surrounding the semi-soluble polymer nanoparticle 204. The base resin 112 may retain its original chemistry around the semi-soluble polymer nanoparticle 204. In one example, the partial dissolution of a semi-soluble polymer nanoparticle 204 may a result in a gradient 214 of toughness that extends from the particle center 210 toward the base resin 112 surrounding the location of the semi-soluble polymer nanoparticle 204. In some examples, the toughness may be highest near the particle center 210 due to a higher concentration of the original polymer nanoparticle material at the particle center 210. The toughness may gradually decrease along a direction toward the base resin 112 surrounding the semi-soluble polymer nanoparticle 204. Advantageously, by at least partially dissolving the semi-soluble polymer nanoparticle 204 in the resin 112 to create a gradient 214 of properties, an otherwise abrupt or sharp interface between the base resin 112 and non-soluble polymer nanoparticle (not shown) may be avoided which may thereby avoid stress concentrations where microcracking may initiate or propagate.

As may be appreciated, semi-soluble polymer nanoparticles 204 may also be at least partially dissolved in a resin 112 to result in property gradients 214 (FIG. 6A) other than toughness. For example, partial dissolution of semi-soluble polymer nanoparticles 204 may result in local gradient 214s of elastic modulus, strength, strain-to-failure, cure shrinkage, heat of reaction, coefficient of thermal expansion (CTE), flammability resistance, smoke and/or toxicity release, and any one of a variety of other mechanical properties.

Figure 7A:
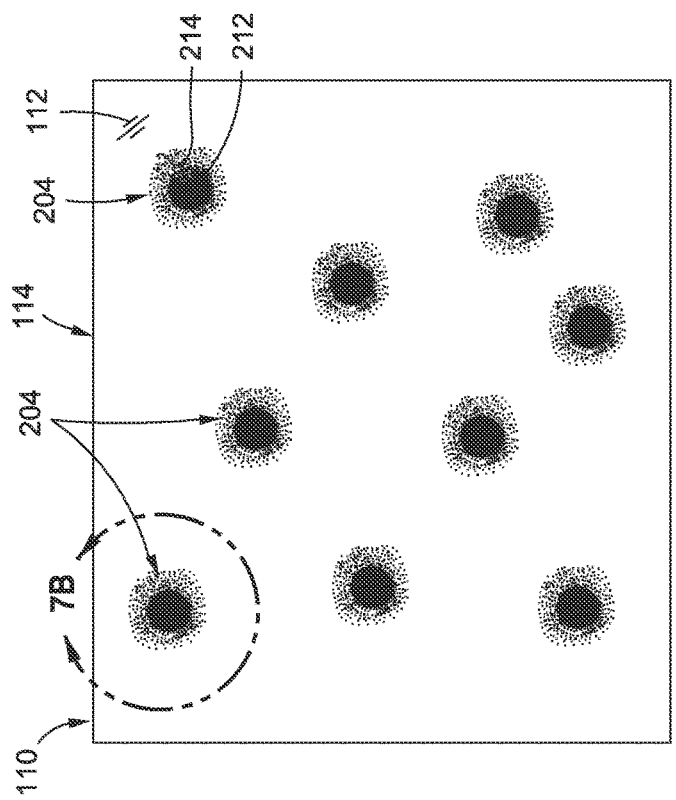
FIG. 7A is a schematic illustration of the cured resin mixture of FIG. 7 showing the partial dissolution of the semi-soluble polymer nanoparticles in the resin and further showing each semi-soluble polymer nanoparticles maintaining a pure nanoparticle core.
Figure 7:
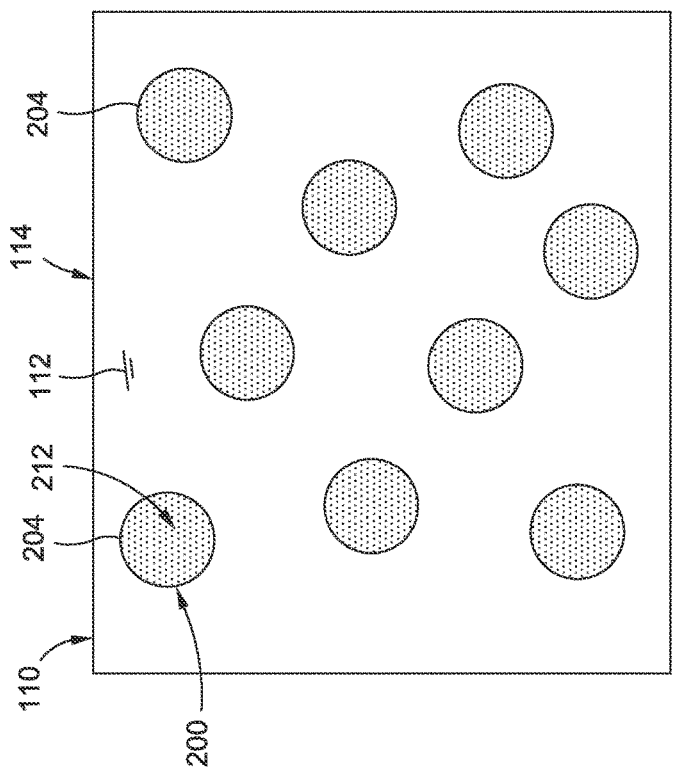
FIG. 7 is a schematic illustration of an uncured resin mixture illustrating a plurality of semi-soluble polymer nanoparticles in the resin mixture.

FIG. 7 is a schematic illustration of an uncured resin mixture 114 containing semi-soluble polymer nanoparticles 204 in the resin mixture 114. FIG. 7A is a schematic illustration of the cured resin mixture 114 of FIG. 7 showing the partial dissolution of the semi-soluble polymer nanoparticles 204 in the resin 112. The result of the partial dissolution of the polymer nanoparticles 200 in FIG. 7A is similar to the partial dissolution of semi-soluble polymer nanoparticles 204 in FIG. 6A, with the exception that in FIG. 7A, a pure nanoparticle core 212 remains at the location of each semi-soluble polymer nanoparticle 204.

Figure 7B:
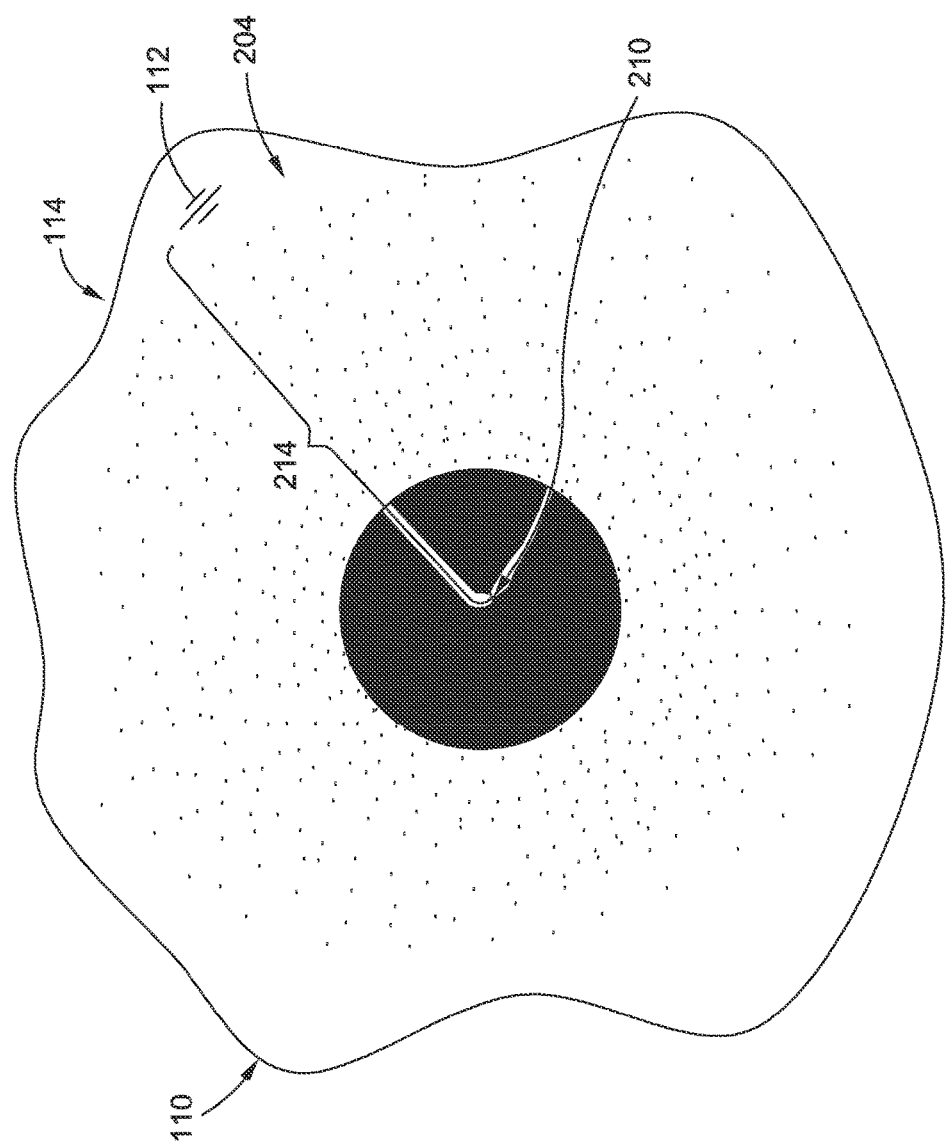
FIG. 7B is a schematic illustration of a semi-soluble polymer nanoparticle of FIG. 7A and schematically illustrating a gradient of toughness extending from the pure nanoparticle core to the base resin surrounding the semi-soluble polymer nanoparticle.

FIG. 7B schematically illustrates the semi-soluble polymer nanoparticles 204 of FIG. 7A and showing a gradient 214 of toughness extending from the pure nanoparticle core 212 of each semi-soluble polymer nanoparticle 204 to the base resin 112 surrounding the semi-soluble polymer nanoparticle 204. As indicated above, the material composition of the polymer nanoparticles 200 may be selected to alter or improve one or more specific properties of the resin 112, and are not limited to improving toughness the resin 112.

FIG. 8 is a schematic illustration of an uncured resin mixture 114 containing a plurality of core-sheath nanoparticles 240. Each core-sheath nanoparticle 240 may include a sheath 242 encapsulating a core 244. The sheath 242 may be formed of a different material than the core 244. The sheath 242 may be soluble in the resin 112 such that only the core 244 remains after the resin 112 cures. The core 244 may be formed of insoluble material. In some examples, the sheath 242 may be semi-soluble in the resin 112 such that the sheath 242 adhesively bonds the core 244 to the cured resin 112 without the use of reactive species that may undesirably generate heat.

Figure 8A:
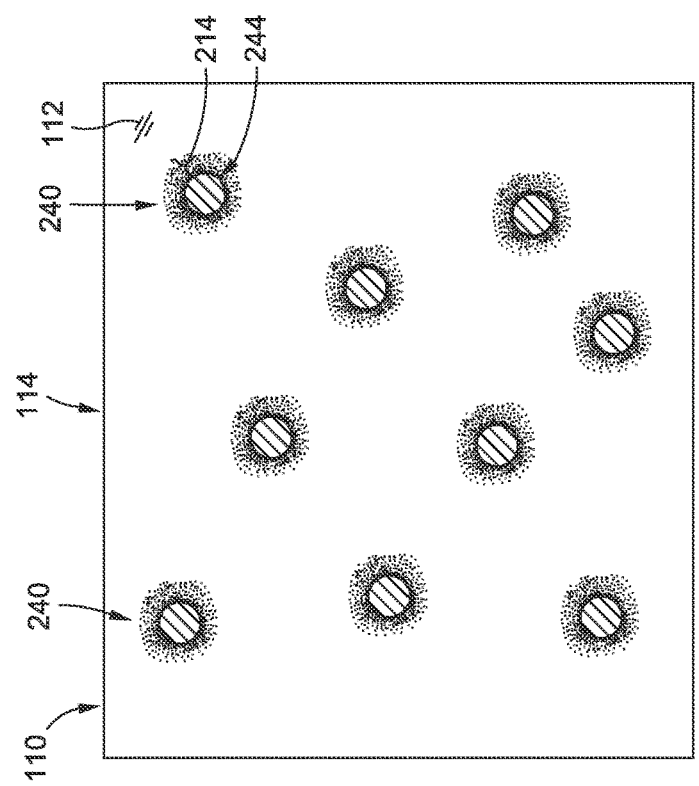
FIG. 8A is a schematic illustration of the cured resin mixture of FIG. 8 showing the dissolution of the sheaths into the resin such that only the core remains after curing of the resin.
Figure 8:
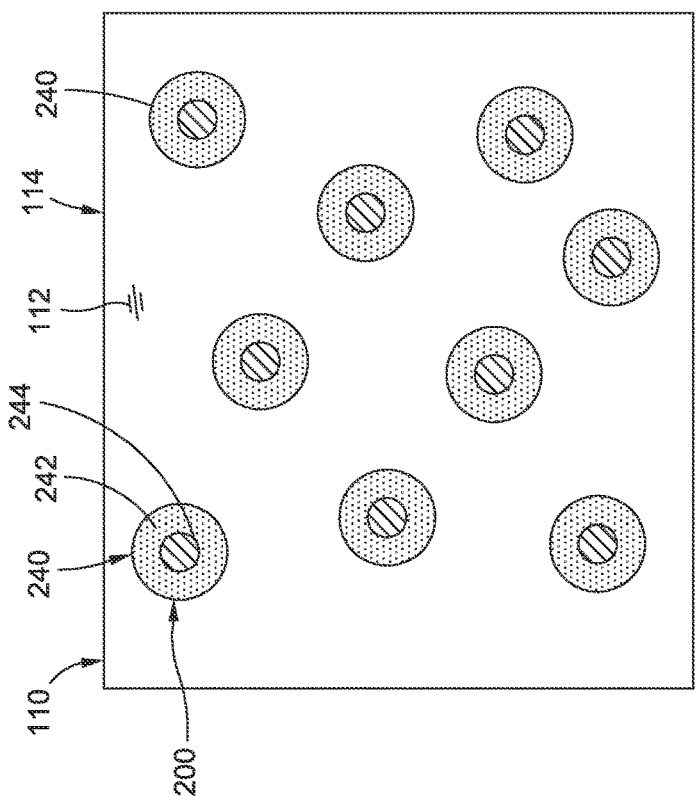
FIG. 8 is a schematic illustration of an uncured resin mixture illustrating a plurality of core-sheath nanoparticles in the resin mixture with each core-sheath nanoparticle having a sheath encapsulating a core.

FIG. 8A is a schematic illustration of the cured resin mixture 114 of FIG. 8 showing the dissolution of the sheaths 242 into the resin 112 such that only the cores 244 remain after the resin 112 cures. The material composition of the core 244 may be selected to improve one or more specific properties of the resin 112, and which may be different than the resin 112 properties that may be improved by dissolution of the sheath 242 (FIG. 8). The core 244 may be formed of any material from which the resin 112 may be formed. The core 244 may be formed of a material composition that has a reduced cure shrinkage relative to the resin cure shrinkage, a reduced heat of reaction relative to the resin heat of reaction, a reduced coefficient of thermal expansion (CTE) relative to the resin CTE, or any one of a variety of other properties including, but not limited to, any of the above-mentioned property improvements or performance advantages provided by polymer nanoparticles 200 (FIG. 8). The at least partial dissolution of the sheath 242 may result in a gradient 214 of mechanical properties extending from a particle center 210 toward the base resin 112, as described above for the examples in FIGS. 5-7B.

Figure 9A:
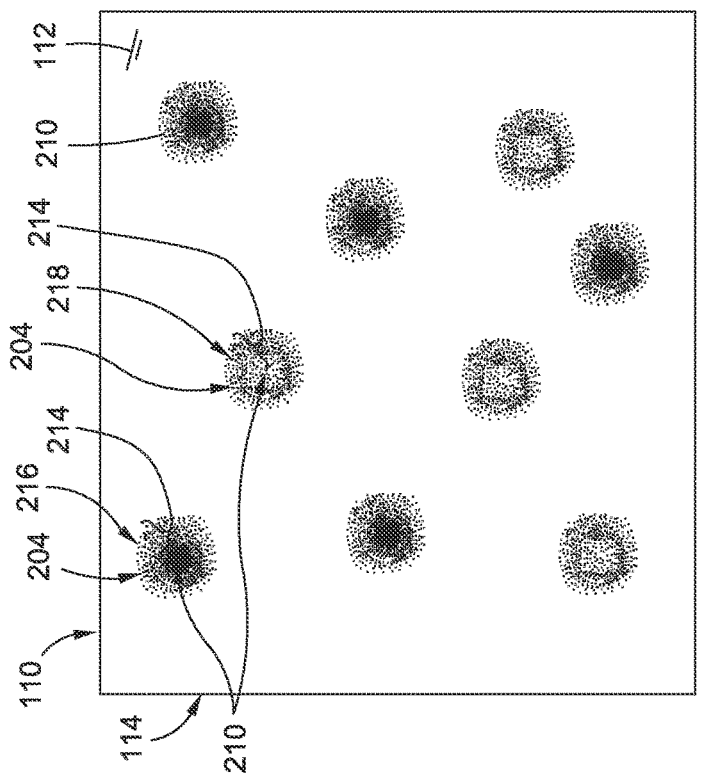
FIG. 9A is a schematic illustration of the cured resin mixture of FIG. 9 showing the partial dissolution of the two different types of polymer nanoparticles in the resin and resulting in a gradient of toughness around the location of each polymer nanoparticle.
Figure 9:
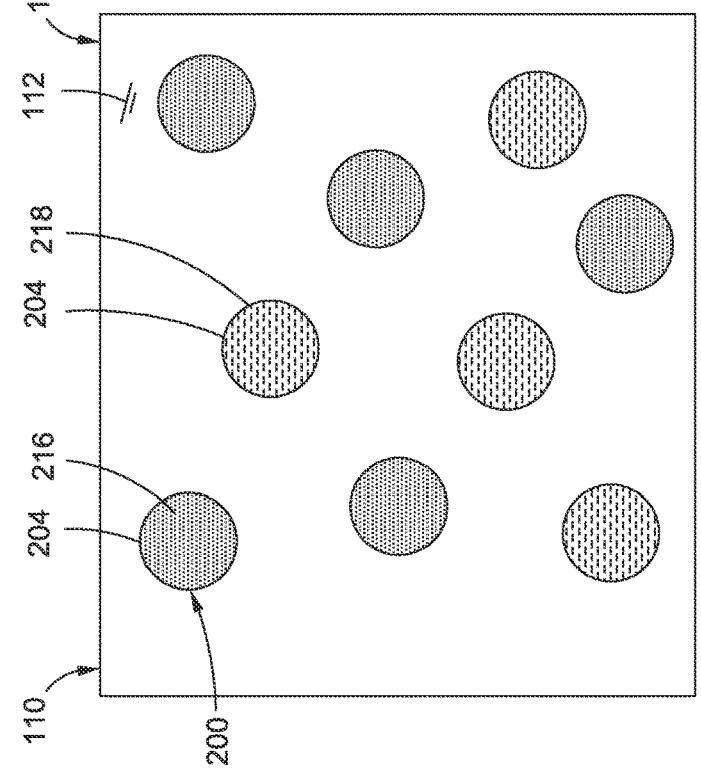
FIG. 9 is a schematic illustration of an uncured resin mixture containing a plurality of two different types of polymer nanoparticles.

FIG. 9 is a schematic illustration of an uncured resin mixture 114 containing a plurality of two different types of polymer nanoparticles 200. One or more of the polymer nanoparticles 200 may be formed of a first nanoparticle material 216, and one or more of the polymer nanoparticles 200 may be formed of a second nanoparticle material 218 which may have different properties than the first nanoparticle material 216. The polymer nanoparticles 200 may be configured as fully-soluble polymer nanoparticles 202 (FIG. 5) and/or as semi-soluble polymer nanoparticles 204. In the example shown, the polymer nanoparticles 200 are configured as semi-soluble polymer nanoparticles 204.

FIG. 9A is a schematic illustration of the cured resin mixture 114 of FIG. 9 showing the partial dissolution of the two different types of semi-soluble polymer nanoparticles 204 in the resin 112 and resulting in a gradient 214 of toughness around the location of each semi-soluble polymer nanoparticles 204. The polymer nanoparticles 200 may be configured such that at potentially different points during the cure cycle, the semi-soluble polymer nanoparticles 204 may at least partially dissolve into the resin 112. As discussed above, the points at which the polymer nanoparticles 200 dissolve may be controlled by configuring the solubility or material composition of each type of semi-soluble polymer nanoparticles 204. In one example, the dissolution of the semi-soluble polymer nanoparticles 204 and the subsequent curing of the resin 112 may result in a resin mixture 114 that may be toughened with a controlled number of polymer nanoparticles 200 that may each have a gradient 214 of toughness around the location of each semi-soluble polymer nanoparticle 204. The resin 112 may maintain its original chemistry around the location the semi-soluble polymer nanoparticles 204.

The selection of the chemistry and quantity of the semi-soluble polymer nanoparticles 204 provides a means to create a multi-phase resin wherein the size and properties of the different phases of the resin 112 can be controlled. For example, adding 20 weight % of a thermoset polyimide core and soluble high molecular weight thermoplastic polyimde sheath nanoparticle to an epoxy resin will result in a multiphase resin containing an epoxy phase and discrete epoxy-polyimide blend phases surrounding nanoscopic polyimide phases. In contrast, adding 75 weight % of the thermoset polyimide core and soluble high molecular weight thermoplastic polyimde sheath nanoparticle to an epoxy resin will result in a multiphase resin containing small/localized epoxy phases between a large epoxy-polyimide blend phases surrounding nanoscopic polyimide phases.

Figure 10:
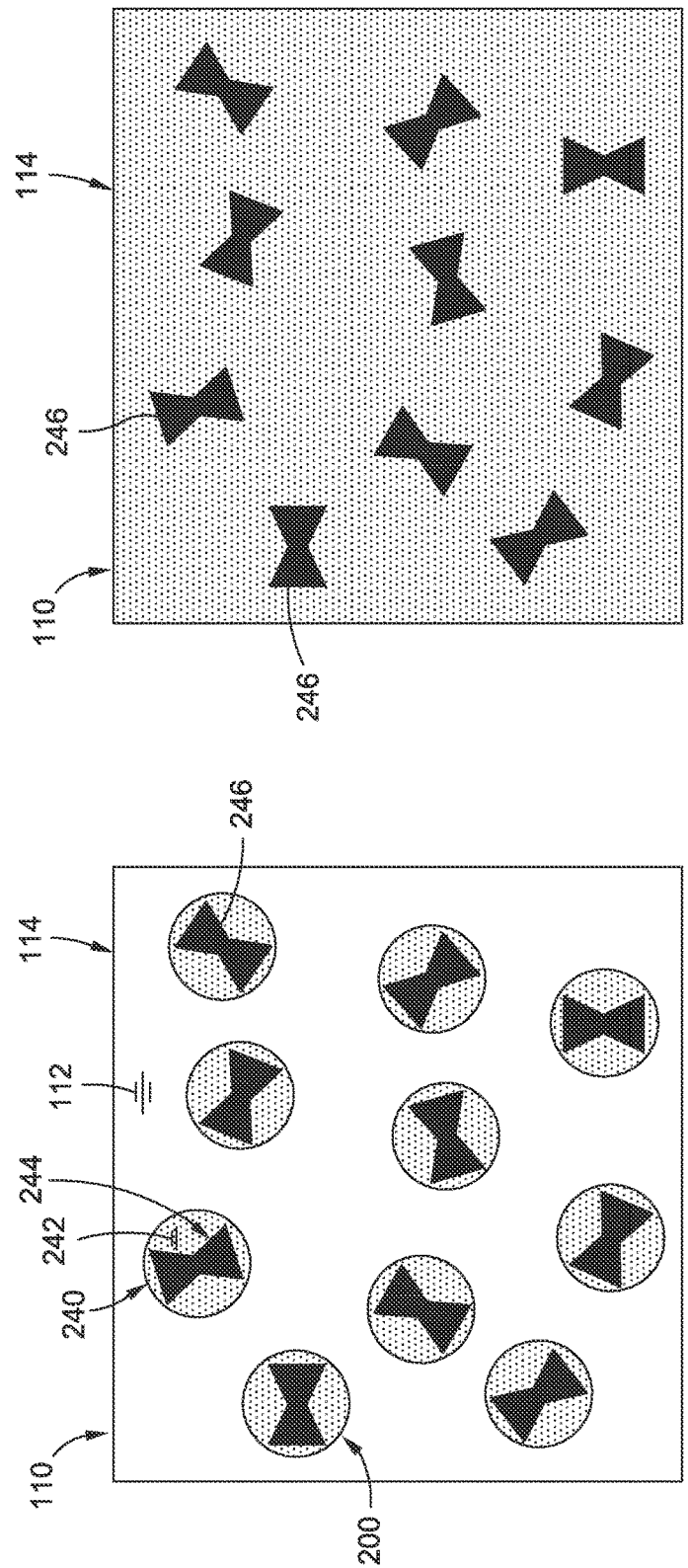
FIG. 10 is a schematic illustration of an uncured resin mixture containing a plurality of core-sheath nanoparticles each having a soluble sheath encapsulating a shaped particle.

FIG. 10 is a schematic illustration of an uncured resin mixture 114 containing a plurality of core-sheath nanoparticles 240 each having a sheath 242 encapsulating a shaped particle 246 or a non-spherical particle. The shaped particle 246 may be insoluble in the resin 112. The sheath 242 may be soluble and may be generally rounded or spherical as described above to improve the dispersion capability of the core-sheath nanoparticles 240 within the resin 112 and to minimize effects on resin viscosity. The core-sheath nanoparticles 240 may be used in any of the above-described implementations of polymer nanoparticles 200. For example, core-sheath nanoparticles 240 may be included in adhesives, coatings, plastics for injection molding, resins 112 for composite layups 102 (FIG. 4), and any applications. The sheath 242 of the core-sheath nanoparticles 240 may be provided in the sizes (e.g., between 10-200 nm), load levels (e.g., up to 75 percent by volume of a resin mixture 114), and may be formed of any one of the above-described materials for polymer nanoparticles 200. Core-sheath nanoparticles 240 may be applied to resin 112, to fibers 118, and/or to a composite layup 102 using any of the above-described techniques for applying polymer nanoparticles 200 to resin 112, fibers 118 (FIG. 2), and composite layups 102. For example, core-sheath nanoparticles 240 may be applied to tapes, fabrics, braids, chopped fiber mats, and any one of a variety of other fiber forms during prepregging operations. In another example, a solution of core-sheath nanoparticles 240 may be selectively applied to target locations of a dry fiber composite layup 102 in the same manner as described above for applying polymer nanoparticles 200.

Although FIG. 10 illustrates shaped particles 246 in a bow tie configuration, shaped particles 246 may be provided in any one of a variety of sizes, shapes, and configurations to achieve specific functionalities of a resin 112 such as to direct the propagation of cracks (FIG. 23) as discussed below, and/or to improve specific properties of a resin 112. For example, the shaped particles 246 may be electrically conductive to improve the charge distribution capability of a composite structure 100 as may be desirable in the event of a lightning strike. The shaped particles 246 may also cause one or more properties of a resin 112 to be non-isotropic. For example, shaped particles 246 in a resin 112 may cause the coefficient of thermal expansion (CTE), the stiffness (e.g., modulus), the strength, the conductivity (electrical or thermal), and/or the failure strain of the resin 112 to have different values along different directions of the resin 112 to achieve certain design requirements. In the example of failure strain, the shaped particles 246 may be configured and actively oriented in a manner that results in a greater failure stain of the resin 112 along a direction transverse to a lengthwise direction of the reinforcing fibers 118 (FIG. 2), and a lower failure stain of the resin 112 along directions non-transverse to the lengthwise direction of the reinforcing fibers 118.

FIG. 10A is a schematic illustration of the cured resin mixture 114 of FIG. 10 after dissolution of the sheaths 242 during the cure cycle such that only the shaped particles 246 remain after the resin mixture 114 cures. Advantageously, the dissolved sheath 242 may adhesively bond the core 244 (FIG. 10) to the cured resin 112 without the use of reactive species that may undesirably generate heat. Dissolution of the sheath 242 within the resin 112 may result in a significant increase in the toughness of the resin mixture 114 similar to the above-described toughness increase provided by the at least partial dissolution of polymer nanoparticles 200. Advantageously, by using a spherically-shaped sheath, the shaped particles 246 may be uniformly distributed within the resin 112 (FIG. 10) without agglomeration during resin flow, and without significantly increasing resin viscosity. The shaped particles 246 may be formed of any one of a variety of materials including, but not limited to, metallic material, polymeric material, and inorganic material including ceramics and glasses. In some examples, the shaped particles 246 may be formed of the same material as the resin 112 and may be at least partially cured prior to curing of the resin mixture 114.

The sheath 242 of the core-sheath nanoparticles 240 may be formed of a different material than the sheath 242 of other core-sheath nanoparticles 240 in the resin mixture 114. For example, the sheath 242 (FIG. 10) of some of the core-sheath nanoparticles 240 may be formed of a material that locally increases the toughness of the resin 112, and the sheath 242 of other core-sheath nanoparticles 240 in the same resin mixture 114 (FIG. 10A) may be formed of a different material which improves the stiffness or modulus of the resin 112 or provides other improvements to the properties of the resin 112. A single core-sheath nanoparticle 240 may contain two or more shaped particles 246 which may be shaped the same as one another, or the shaped particles 246 (FIG. 10A) may have different shapes. Multiple shaped particles 246 in a single core-sheath nanoparticle 240 may be formed of the same material or of different materials. For example, a resin mixture 114 may include core-sheath nanoparticles 240 each having two or more shaped particles 246 in each core-sheath nanoparticle. Some of the core-sheath nanoparticles 240 (FIG. 10) in the resin mixture 114 may include one shaped particle 246 formed of metallic material to improve the electrical conductivity of the resin mixture 114, and another shaped particle 246 may be formed of ceramic material to reduce the net cure shrinkage of the resin mixture 114.

Figure 11:
FIG. 11 through 21 are non-limiting examples of different configurations of shaped particles that may be encapsulated in a core-sheath nanoparticle.
Figure 12:
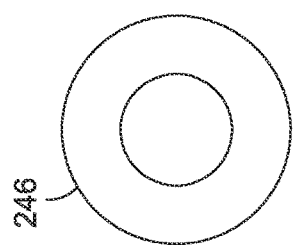
Figure 13:
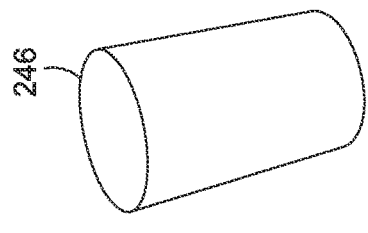
Figure 14:
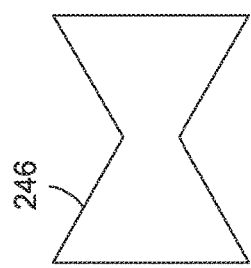
Figure 15:
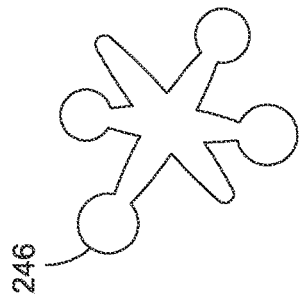
Figure 16:
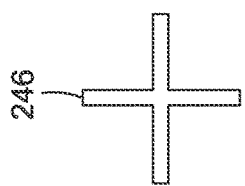
Figure 17:
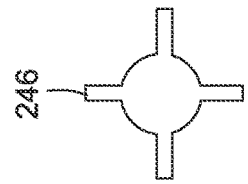
Figure 18:
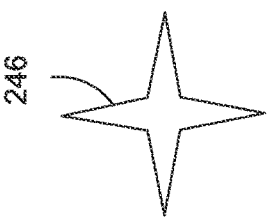
Figure 19:
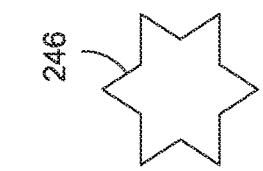
Figure 20:
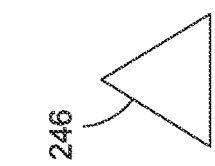
Figure 21:
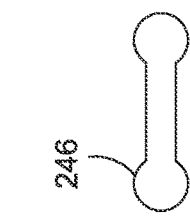

FIG. 11 through 21 are non-limiting examples of different configurations of shaped particles 246 that may be encapsulated in a core-sheath nanoparticle. For example, FIG. 11 illustrates a toroid configuration, FIG. 12 illustrates a disk with a hole, FIG. 13 illustrates a cylinder, FIG. 14 illustrates a bow tie, FIG. 15 illustrates a jack configuration, and FIG. 16 illustrates a cross. FIG. 17 illustrates a cross having a central mass, FIG. 18 illustrates a 4-point star, FIG. 19 illustrates a 6-point star, FIG. 20 illustrates a triangle configuration, and FIG. 21 illustrates a dog bone configuration. Any one or more of the shapes may be provided as thin plates or the shapes may have varying thicknesses. For example, a triangle shaped particle may be provided as a thin plate or as a pyramid. A square shaped particle may be provided as a thin plate or as a cube, etc. As may be appreciated, the shaped particles 246 may be provided in any one of a variety of different shapes and configurations, without limitation. The size and configuration of a shaped particle 246 may be selected to provide desired effects on one or more properties of the resin 112 (FIG. 10).

Figure 22A:
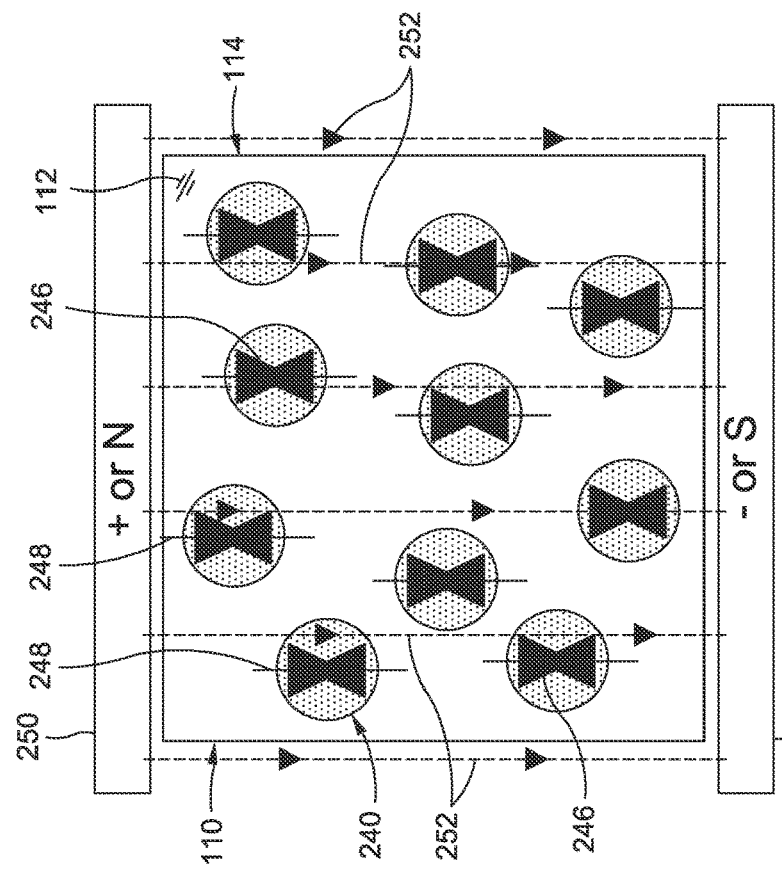
FIG. 22A is a schematic illustration of an electrical or magnetic field applied to an uncured resin mixture containing core-sheath nanoparticles encapsulating shaped particles and showing the active alignment of the particle axes with electrical or magnetic field lines.
Figure 22:
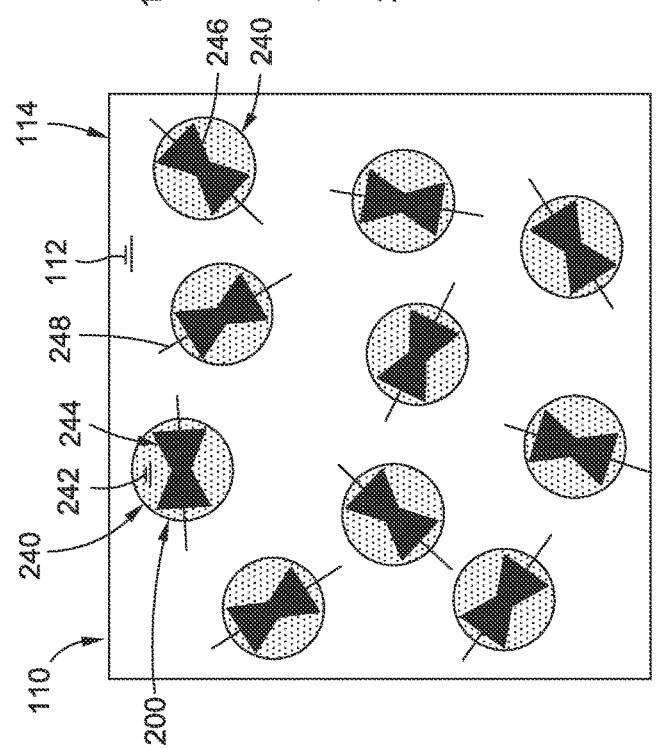
FIG. 22 is a schematic illustration of an uncured resin mixture containing a plurality of core-sheath nanoparticles randomly oriented in the resin mixture.

FIG. 22 is a schematic illustration of an uncured resin mixture 114 containing a plurality of core-sheath nanoparticles 240. In the example shown, the shaped particles 246 each have a bow tie configuration, although the shaped particles 246 may be provided in any one of a variety of different configurations, as indicated above. Each one of the shaped particles 246 has a particle axis 248 which is shown extending along a lengthwise direction of the bow tie configuration. In FIG. 22, the particle axes 248 of the shaped particles 246 are randomly oriented in the resin mixture 114.

FIG. 22A is a schematic illustration of a device that may be implemented for orienting the particle axes 248 of the shaped particles 246. In the example shown, the device includes a spaced pair of elements 250 which may be configured as bars or plates positioned in spaced relation to one another. A potential difference or charge may be applied across the elements 250 to generate an electrical and/or magnetic field across the resin mixture 114. In some examples, diametrically opposite sides of the shaped particles 246 may be oppositely charged along the particle axes 248. The application of the potential difference across the spaced pair of elements 250 may cause rotation of the core-sheath nanoparticles 244 (FIG. 22) until the particle axes 248 align with the magnetic field lines 252, and which may result in the particle axes 248 to be oriented generally parallel to one another as shown. The application of the potential difference across the elements 250 may be applied during a low viscosity portion of the cure cycle to allow the core-sheath nanoparticles 240 to easily rotate into the desired orientation. Advantageously, the spherical shape of the sheath 242 (FIG. 22) provides little resistance to the rotation of the core-sheath nanoparticles 240 within the uncured resin. Such resistance to rotation may otherwise occur if the shaped particles 246 were non-encapsulated by a spherical sheath.

Figure 22C:
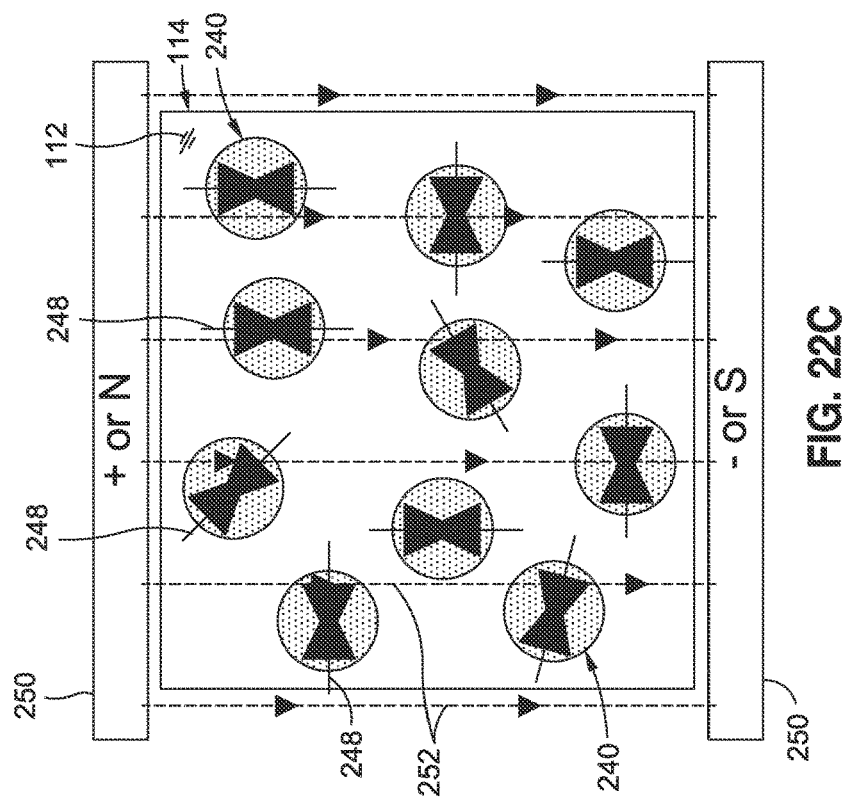
FIG. 22C is a schematic illustration of core-sheath nanoparticles in an uncured resin mixture and showing some of the shaped particles oriented along two different directions in response to an electrical or magnetic field, and some of the shaped particles being randomly oriented.
Figure 22B:
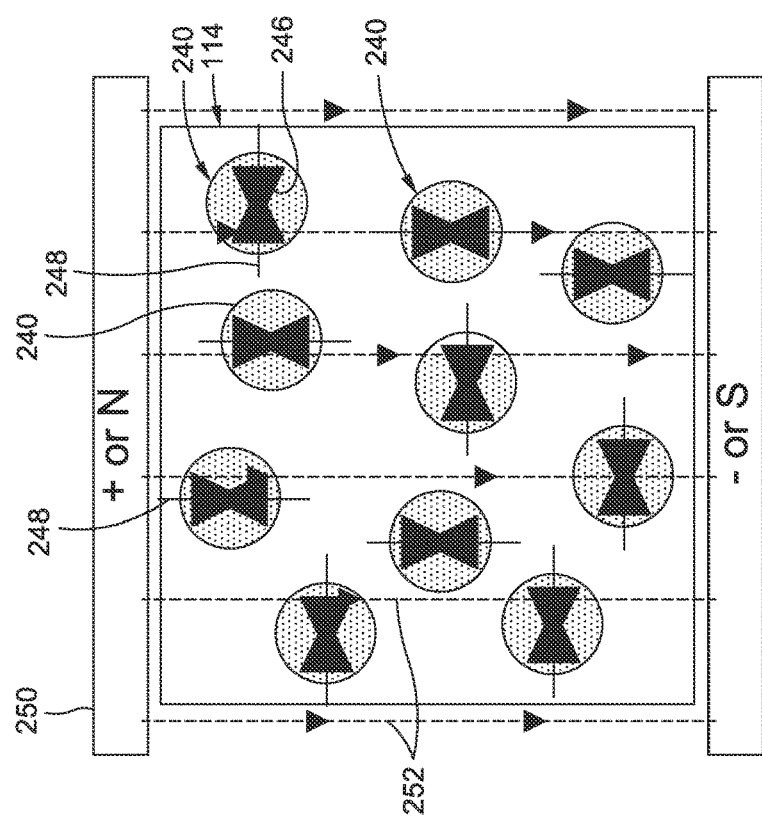
FIG. 22B is a schematic illustration of core-sheath nanoparticles in an uncured resin mixture and showing the shaped particles oriented along two different directions.

FIG. 22B is a schematic illustration of core-sheath nanoparticles 240 in an uncured resin mixture 114 and showing the shaped particles 246 oriented along two different directions. In the example shown, the shaped particles 246 may be configured such that upon application of an electrical and/or magnetic field, the shaped particles 246 are actively oriented into specific directions. FIG. 22C illustrates a plurality of core-sheath nanoparticles 240 in an uncured resin mixture 114 and showing some of the shaped particles 246 oriented along two specific directions in response to the application of an electrical or magnetic field, and additionally showing some of the shaped particles 246 that are non-responsive to the electrical and/or magnetic field and thus remaining randomly oriented.

Figure 23:
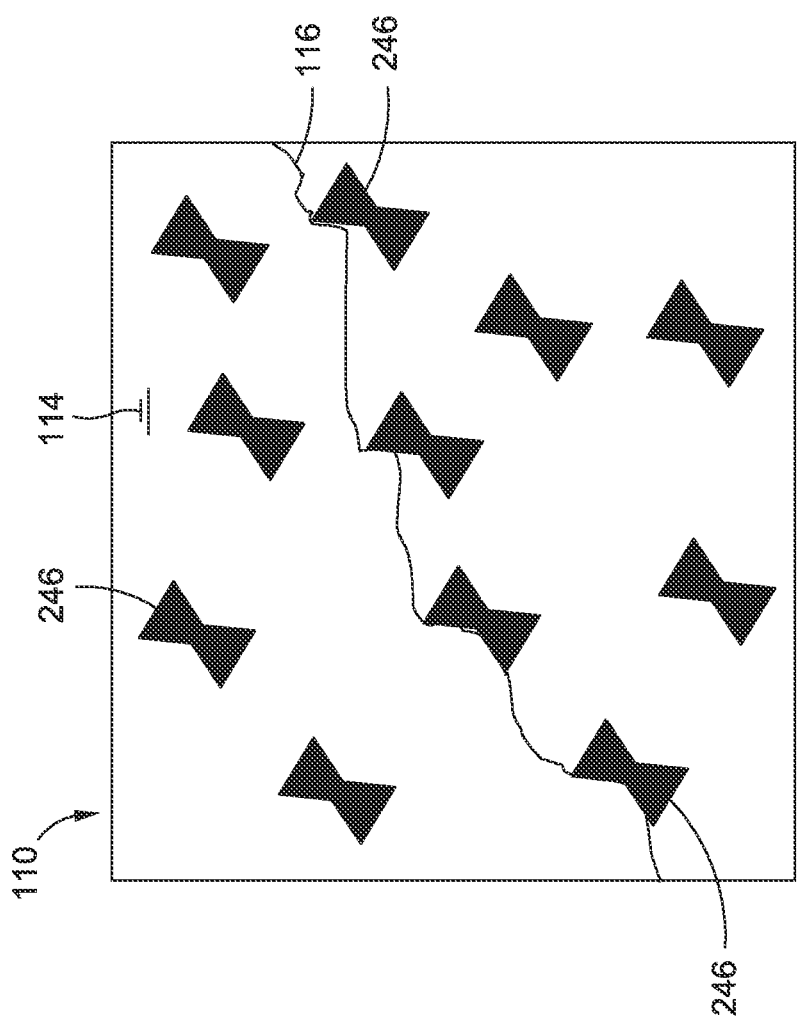
FIG. 23 is a schematic illustration of shaped particles oriented along a common direction to influence the direction of the propagation of a crack.

FIG. 23 is a schematic illustration of shaped particles 246 oriented along a common direction to illustrate the influence of the orientation of the shaped particles 246 on the propagation of a crack 116 in the resin 112 (FIG. 22). In the example shown, each shaped particle 246 has a particle axis 248 extending along a lengthwise direction of the shaped particle 246. Opposite ends of the shaped particles 246 may be oppositely charged such that upon application of an electrical and/or magnetic field, the particle axis 248 (FIG. 22C) are oriented into alignment with the magnetic field lines 252, as described above. In some examples, the shaped particles 246 may directly influence the propagation of a crack 116 by altering the path of the crack 116. In other examples, the shaped particles 246 (FIG. 22B) may indirectly influence the propagation of a crack 116 by the changing the properties of the resin 112 in different directions as result of the presence of the shaped particles 246 in the resin 112. For example, a crack 116 may preferentially progress along a direction where the crack 116 overcomes the local failure strain of the resin 112 in response to local stresses.

Figure 24:
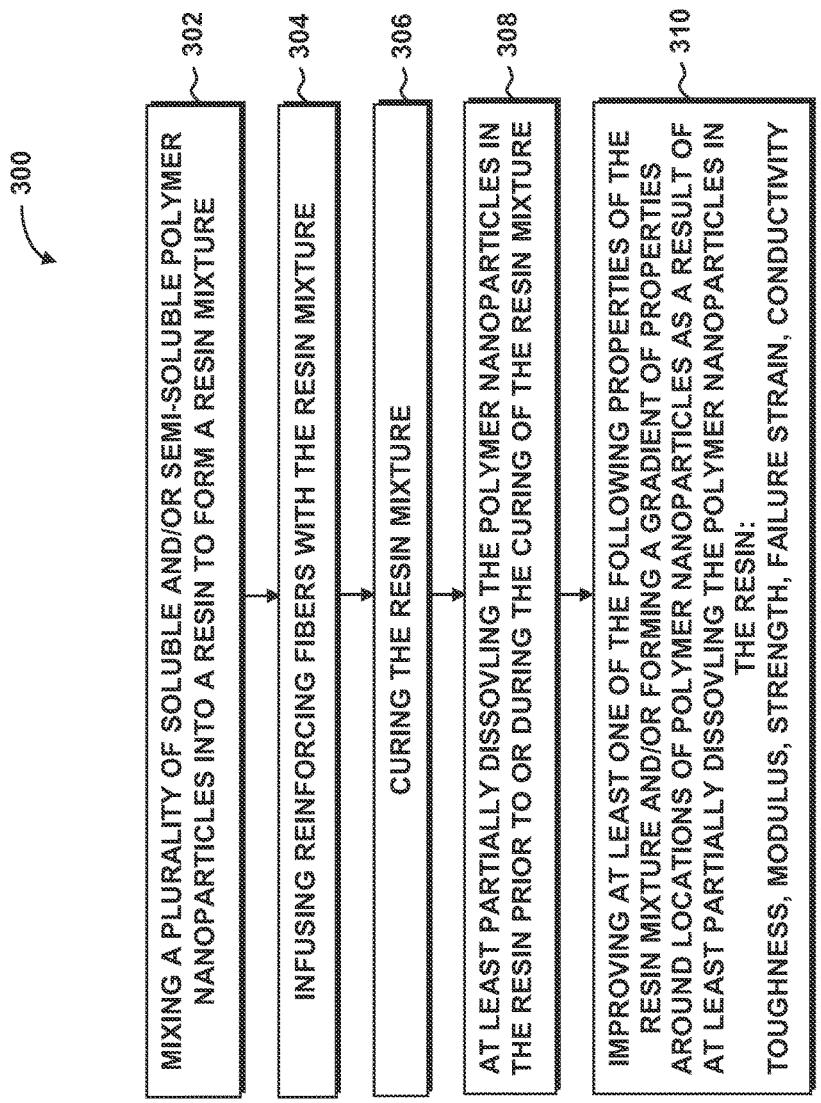
FIG. 24 is a flowchart illustrating one or more operations that may be included in a method of manufacturing a composition.

FIG. 24 is a flowchart illustrating one or more operations that may be included in a method 300 of manufacturing a composition 110. Step 302 of the method may include mixing polymer nanoparticles 200 such as soluble and/or semi-soluble polymer nanoparticles 202 (FIG. 5), 204, 200 into a resin 112 to form a resin mixture 114 (FIG. 5). As indicated above, the polymer nanoparticles 200 may be mixed into any one of a variety of different thermosetting or thermoplastic resins 112. In addition, the polymer nanoparticles 200 may be provided in any one of a variety of different thermosetting and/or thermoplastic materials. In some examples, the polymer nanoparticles 200 may be formed of the same material as the resin 112 (FIG. 5) and may be partially or fully cured or solidified prior to the curing of the resin 112. In addition, polymer nanoparticles 200 formed of one material and/or size may be mixed with the resin 112 with polymer nanoparticles 200 formed of other materials and/or sizes. Providing polymer nanoparticles 200 (FIG. 5) of different materials and/or sizes in the same resin mixture 114 may provide a means for tailoring the material composition of the resin 112 to achieve different properties in the resin 112. For example, polymer nanoparticles 200 formed of a material for increasing the toughness of a resin 112 may be provided in relatively greater quantity and in larger sizes than other polymer nanoparticles 200 that may be added to the resin 112 for the purpose of increasing the modulus of the resin 112.

Step 304 of the method 300 may include infusing reinforcing fibers 118 (FIG. 2) with the resin mixture 114 prior to curing the resin mixture 114. As indicated above, polymer nanoparticles 200 may be added to a resin mixture 114 during prepregging operations for prepregging any one of a variety of fiber forms. For example, polymer nanoparticles 200 may be mixed with a resin 112 to form a resin mixture 114 (FIG. 2) which may then be applied to any one of a variety of fiber forms (e.g., fiber tows, unidirectional tape, woven fabric, braided fibers, etc.) during prepregging operations. The prepreg fiber forms may then be laid up as composite plies 104 in a stacked formation to which heat and/or pressure may be applied to consolidate and cured or solidify the resin 112 to form a composite structure 100. In another example, one or more dry fiber preforms 124 (FIG.

2) may be laid up in a stacked formation after which the layup may be infused with resin 112 containing polymer nanoparticles 200. The resin-infused layup may then be consolidated and/or cured or solidified to form a composite structure 100. In still other examples, resin films (not shown) containing polymer nanoparticles 200 may be laid up between one or more prepreg composite plies or dry fiber composite plies followed by the application of heat and/or pressure to cure and/or solidify the resin 112 (FIG. 2) to form a composite structure 100. Other techniques are available for applying polymer nanoparticles 200 to a resin mixture 114. It should also be noted that the present disclosure contemplates forming compositions containing polymer nanoparticles 200 in resin 112, and wherein the composition 110 is devoid of reinforcing fibers. For example, polymer nanoparticles 200 in resin 112 may be used as coatings, adhesives, injection moldable plastics, and other applications.

In some examples, the method may include mixing into the resin 112 two different types of polymer nanoparticles 200 such as a first polymer nanoparticle type (not shown) and a second polymer nanoparticle (not shown). The dissolution of the first polymer nanoparticles and/or the second polymer nanoparticles may result in resin properties that are different than the properties of resin lacking first and/or second polymer nanoparticles. In some examples, the dissolution of the first polymer nanoparticle type may result in different properties in the resin 112 (FIG. 10) relative to the resin properties resulting from the dissolution of the second polymer nanoparticle type. Further this regard, three or more types of polymer nanoparticles 200 may be mixed in a resin 112 to achieve distinct properties in the resin 112. For example, one type of polymer nanoparticle 200 may include a catalyst that may dissolve in the resin 112 and promote the cross-linking reaction of thermosetting resin 112. A second type of polymer nanoparticle 200 may be a core-sheath nanoparticle 240 having shaped particles 246 (FIG. 10A) to control the propagation of cracks 116 in the resin 112. A third type of polymer nanoparticle 200 may be formed of a material that has a higher toughness in the resin 112 such that upon dissolution of the toughening polymer nanoparticle 200 (FIG. 10), the resin mixture 114 has a higher net toughness than the base resin 112.

In another embodiment, different concentrations of polymer nanoparticles 200 may be applied to different locations or regions of a composite layup 102. In this regard, the method may include adding a higher concentration of polymer nanoparticles 200 to a first region 220 of the resin 112 (FIG. 5) relative to the concentration of polymer nanoparticles 200 added to a second region 222 of the resin 112, and generating different properties of the resin 112 in the first region 220 relative to the properties of the resin 112 in the second region 222 (FIG. 4) as a result of the higher concentration of polymer nanoparticles 200 in the first region 220 relative to the concentration of polymer nanoparticles 200 (FIG. 4) in the second region 222. For example, a higher concentration of polymer nanoparticles 200 may be added to the interlaminar region 106 between one or more of the composite plies 104 of composite layup 102. Remaining regions of the composite layup 102 (FIG. 4) may receive a lower concentration of polymer nanoparticles 200 relative to the interlaminar regions 106, or the remaining regions may be devoid of polymer nanoparticles 200.

Step 306 of the method 300 may include curing or solidifying the resin mixture 114. As indicated above, thermosetting resin 112 (FIG. 6) may be cured by the application of heat and/or a catalyst to initiate the cross-linking reaction for curing the thermosetting resin 112. Hardener may also be added to promote the cross-linking reaction. A composite layup 102 (FIG. 2) containing thermoplastic resin 112 may be formed by passively or actively reducing the temperature of the thermoplastic resin 112 below the glass transition temperature.

Step 308 of the method 300 may include at least partially dissolving the polymer nanoparticles 200 in the resin 112 prior to or during the curing or solidifying of the resin 112. In some examples, the method may include fully dissolving polymer nanoparticles 200 in the resin 112 prior to or during curing or solidifying of the resin 112 (FIG. 8). In other examples where the polymer nanoparticles 200 are semi-soluble polymer nanoparticles 204, the method may include partially dissolving the polymer nanoparticles 200 such that a gradient 214 of mechanical properties may be formed between a particle center 210 and the base resin 112 surrounding the location of each semi-soluble polymer nanoparticle 204. In some examples, the polymer nanoparticles 200 may be core-sheath nanoparticles 240 including a soluble or semi-soluble sheath 242 encapsulating an insoluble core 244. In some examples, the core 244 (FIG. 8) may be formed as a shaped particle 246 (FIG. 10A) as described above. The at least partial dissolution of the sheath 242 may advantageously result in a gradient 214 of properties around the shaped particle 246. In addition, the partial dissolution of the sheath 242 may result in the non-reactive bonding of the core 244 or shaped particle 246 to the resin 112 during curing of the resin 112.

Prior to or during the process of curing the resin 112, the method may include maintaining the polymer nanoparticles 200 in a generally solid state for a predetermined time and below a predetermined temperature during the curing cycle, and increasing the rate at which the polymer nanoparticles 200 (FIG. 9) dissolve with an increase in temperature and time that the polymer nanoparticles 200 are in the resin 112. In this regard, the material composition of the polymer nanoparticles 200 and/or the cure cycle parameters including the cure temperatures and cure times may be controlled to control the amount of time during which the polymer nanoparticles 200 remain in a generally solid state. For example, it may be desirable that the polymer nanoparticles 200 retain a generally solid state and a generally spherical shape throughout the initial processing of a composite layup 102 (FIG. 4) including during injection or infusion of resin 112 (FIG. 9) into the layup, during vacuum bagging, during consolidation, and/or during other points or the resin cure cycle. Following the majority of resin flow, the polymer nanoparticles 200 may be configured to dissolve at a desired point during the cure cycle such as below the gel point of the resin 112. By ensuring that the polymer nanoparticles 200 dissolve to the desired extent prior to a certain point during curing such as prior to the gel point, the resin 112 may have enough mobility to ensure dissolution of the polymer nanoparticles 200.

In some examples, the method may include mixing core-sheath nanoparticles 240 in a resin 112, and then dissolving the sheath 242 prior to or during the curing of the resin mixture 114 such that only the shaped particles 246 (FIG. 22A) remain in the resin mixture 114. The method may include rotating at least some of the polymer nanoparticles 200 into a desired orientation of the shaped particles 246 relative to at least one common direction prior to curing the resin mixture 114 (FIG. 22). For example, an electrical and/or magnetic field may be applied to a resin mixture 114 containing core-sheath nanoparticles 240 and causing rotation of the nanoparticles until the particle axes 248 (FIG. 22) of the shaped particles 246 are in alignment with the field lines 252 of the electrical and/or magnetic field lines 252. In some examples, the method may include aligning the particle axes 248 of a plurality of shaped particles 246 along a specific direction as a means to redirect the propagation of a crack 116 in the resin 112, as described above.

Step 310 of the method may include improving one or more mechanical properties of the resin mixture 114 as a result of at least partially dissolving the polymer nanoparticles 200 in resin 112. Properties that may be improved as a result of dissolution of the polymer nanoparticles 200 in resin 112 (FIG. 22) may include an improvement in the toughness, modulus, strength, failure strain, electrical or thermal conductivity, and/or any one or more of the above-described properties of a resin 112. For examples where the polymer nanoparticles 200 are at least partially-dissolved within the resin 112 including the sheath 242 (FIG. 22) of core-sheath nanoparticles 240 (FIG. 22), the method may include causing the formation of a gradient 214 of mechanical properties around locations of at least partially dissolved polymer nanoparticles 200. The mechanical properties for which a gradient 214 (FIG. 6A) may be formed may include many of the above-described properties. In some examples, at least partial dissolution of the polymer nanoparticles 200 may result in any one or more of the above-described properties being non-isotropic in the resin 112. For example, at least partial dissolution of one or more polymer nanoparticles 200 may result in the failure strain of the resin 112 along one direction to be greater than the failure strain of the resin 112 along another direction.

Figure 25:
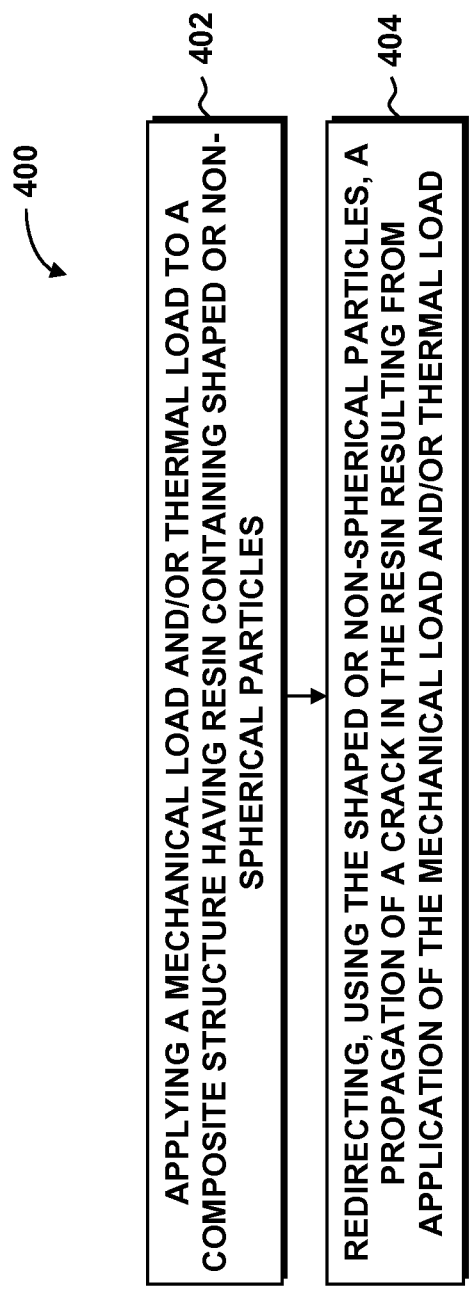
FIG. 25 is a flowchart illustrating one or more operations that may be included in a method of redirecting a crack in a composite structure.

FIG. 25 is a flowchart illustrating one or more operations that may be included in a method 400 of redirecting a crack 116 (FIG. 23) in a composite structure 100 (FIG. 2). The composite structure 100 may be comprised of a resin mixture 114 (FIG. 23) including resin 112 (FIG. 1) containing a plurality of polymer nanoparticles 200 (FIG. 1). Fibers 118 may be embedded in the resin 112. At least some of the polymer nanoparticles 200 may initially be provided in the resin 112 as core-sheath nanoparticles 240 (FIG. 1). Each one of the core-sheath nanoparticles 240 may have a soluble sheath 242 encapsulating a non-soluble core 244 which may be formed as a shaped or non-spherical particle 246 (FIG. 23). The non-spherical particles 246 may be provided in any material, size, shape, and configuration, without limitation. The sheaths 242 (FIG. 22-22C) may be spherical to facilitate rotation of the core-sheath nanoparticles 240 prior to resin cure such that the non-spherical particles may be oriented into at least one common direction as shown in FIG. 23 and described above with regard to FIGS. 22-22C. As mentioned above, dissolution of the sheaths 242 during resin cure may result in the shaped or non-spherical particles remaining in the resin 112.

Step 402 of the method 400 may include applying a mechanical load (not shown) and/or thermal load (not shown) to the composite structure 100 containing the shaped or non-spherical particles 246. Mechanical loads may include, but are not limited to, tension, compression, shear, torsion, and bending loads, or other types of loads. Thermal loads or thermal cycling of the composite structure 100 may occur as a result of temperature changes in the composite structure 100 such as a result of temperature changes in the operating environment of the composite structure 100 during the service life of the composite structure 100. As a result of the mechanical loads and/or thermal loads on the composite structure 100, a crack 116 (FIG. 23) may propagate in the resin 112.

Step 404 of the method 400 may include redirecting the propagation of a crack 116 in the resin 112 using the shaped or non-spherical particles 246 as shown in FIG. 23. A crack 116 may preferentially progress along a direction wherein the crack 116 overcomes the local failure strain of the resin 112 in response to local stresses resulting from the mechanical and/or a thermal load. The shaped or non-spherical particles 246 may directly influence the propagation of a crack 116 by altering the crack path through the resin 112. In addition, the shaped or non-spherical particles 246 may indirectly influence the propagation of a crack 116 by locally changing the resin properties in different directions as a result of the presence of the shaped or non-spherical particles 246.

Illustrative embodiments of the disclosure may be described in the context of a method (not shown) of manufacturing and/or servicing an aircraft, spacecraft, satellite, or other aerospace component. Pre-production, component manufacturing, and/or servicing may include specification and design of aerospace components and material procurement. During production, component and subassembly manufacturing, and system integration of aerospace components takes place. Thereafter, the aircraft, spacecraft, satellite, or other aerospace component may go through certification and delivery in order to be placed in service.

In one example, aerospace components produced by the manufacturing and servicing method may include an airframe with a plurality of systems and an interior. Examples of the plurality of systems may include one or more of a propulsion system, an electrical system, a hydraulic system, and an environmental system. Any number of other systems may be included. Although an aerospace example is shown, different illustrative embodiments may be applied to other industries, such as the automotive industry.

Apparatuses and methods embodied herein may be employed during at least one of the stages of an aerospace component manufacturing and/or servicing method. In particular, a composite structure 100 (e.g., FIG. 1), a coating, an injection-molded plastic, and/or an adhesive may be manufactured during any one of the stages of the aerospace component manufacturing and servicing method. For example, without limitation, a composite structure may be manufactured during at least one of component and subassembly manufacturing, system integration, routine maintenance and service, or some other stage of aircraft manufacturing and servicing. Still further, a composite structure may be used in one or more structures of aerospace components. For example, a composite structure may be included in a structure of an airframe, an interior, or some other part of an aircraft, spacecraft, satellite, or other aerospace component.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A composition, comprising:
a resin;
a plurality of polymer nanoparticles included in the resin to form a resin mixture;
at least some of the polymer nanoparticles are core-sheath nanoparticles that each have a sheath encapsulating a core, the core of at least some of the core-sheath nanoparticles being a shaped particle having a non-spherical shape;
the sheath is fully soluble in the resin prior to or during curing or solidifying of the resin such that only the core remains after the resin mixture cures or solidifies to form a cured resin mixture;

the shaped particles have the same non-spherical shape and each have a particle axis, the particle axes of the shaped particles being oriented in a same direction within the resin mixture prior to or during curing or solidifying.

2. The composition of claim 1, wherein:
the sheath of the core-sheath nanoparticles is generally spherical prior to dissolution of the sheath.

3. The composition of claim 1, wherein:
the resin mixture is included in at least one of the following: a coating, and an adhesive.

4. The composition of claim 1, wherein the resin and/or the sheath and/or the core are comprised of at least one of the following:
thermoplastic material including at least one of the following: acrylics, fluorocarbons, polyamides, polyolefins, polyesters, polycarbonates, polyurethanes, polyaryletherketones, polyetherimides, polyethersulfone, polysulfone, and polyphenylsulfone;
thermosetting material including at least one of the following: polyurethanes, phenolics, polyimides, sulphonated polymer, a conductive polymer, benzoxazines, bismaleimides, cyanate esthers, polyesters, epoxies, and silsesquioxanes.

5. The composition of claim 1, wherein:
the polymer nanoparticles have a cross-sectional width of 10-200 nanometers.

6. The composition of claim 1, wherein:
at least some of the polymer nanoparticles have a cross-sectional width that is different than the cross-sectional width of other polymer nanoparticles in the resin mixture.

7. The composition of claim 1, wherein:
the polymer nanoparticles constitute no less than 10 percent by volume of the resin mixture.

8. The composition of claim 1, wherein:
the polymer nanoparticles constitute up to 75 percent by volume of the resin mixture.

9. A composition, comprising:
a resin;
a plurality of polymer nanoparticles included in the resin to form a resin mixture;
at least some of the polymer nanoparticles are core-sheath nanoparticles that have a sheath encapsulating a core, the core of at least some of the core-sheath nanoparticles being a shaped particle having a non-spherical shape;
the sheath is fully soluble in the resin prior to or during curing or solidifying of the resin such that only the core remains after the resin mixture cures or solidifies to form a cured resin mixture;
at least some shaped particles each have at least one of the following shapes: oblong, elliptical, cylindrical, tubular, cubic, rectangular, pyramidal, bow tie, toroid, disk, jack, cross, star, dog bone, thin plate with triangle shape, thin plate with square shape; and
at least some of the shaped particles have the same non-spherical shape and each have a particle axis, the particle axes of the shaped particles being oriented in a same direction within the resin mixture prior to or during curing or solidifying.

10. The composition of claim 9, wherein:
the particle axis of at least some of the shaped particles is oriented parallel to the particle axis of other shaped particles along two different directions.

11. The composition of claim 9, wherein:
the shaped particles are formed of at least one of the following materials: metallic material, polymeric material, and inorganic material including at least one of ceramics and glasses.

12. The composition of claim 9, wherein:
the sheath of the core-sheath nanoparticles is generally spherical prior to dissolution of the sheath.

13. The composition of claim 9, wherein the resin and/or the sheath and/or the core are comprised of at least one of the following:
thermoplastic material including at least one of the following: acrylics, fluorocarbons, polyamides, polyolefins, polyesters, polycarbonates, polyurethanes, polyaryletherketones, polyetherimides, polyethersulfone, polysulfone, and polyphenylsulfone;
thermosetting material including at least one of the following: polyurethanes, phenolics, polyimides, sulphonated polymer, a conductive polymer, benzoxazines, bismaleimides, cyanate esthers, polyesters, epoxies, and silsesquioxanes.

14. The composition of claim 9, wherein:
the polymer nanoparticles have a cross-sectional width of 10-200 nanometers.

15. The composition of claim 9, wherein:
at least some of the polymer nanoparticles have a cross-sectional width that is different than the cross-sectional width of other polymer nanoparticles in the resin mixture.

16. The composition of claim 9, wherein:
the polymer nanoparticles constitute no less than 10 percent by volume of the resin mixture and/or the polymer nanoparticles constitute up to 75 percent by volume of the resin mixture.

17. An injection moldable plastic, comprising:
a resin;
a plurality of polymer nanoparticles included in the resin to form a resin mixture;
at least some of the polymer nanoparticles are core-sheath nanoparticles that each have a sheath encapsulating a core, the core of at least some of the core-sheath nanoparticles being a shaped particle having a non-spherical shape;
the core of at least one of the core-sheath nanoparticles is formed of polymeric material;
the sheath is fully soluble in the resin prior to or during curing or solidifying of the resin such that only the core remains after the resin mixture cures or solidifies to form a cured resin mixture;
the shaped particles have the same non-spherical shape and each have a particle axis, the particle axes of the shaped particles being oriented in a same direction within the resin mixture prior to or during curing or solidifying, the sheath of at least some of the core-sheath nanoparticles having a material composition that improves a toughness of the resin mixture when cured or solidified.

18. The injection moldable plastic of claim 17, wherein:
the sheath of the core-sheath nanoparticles is generally spherical prior to dissolution of the sheath.

19. The injection moldable plastic of claim 17, wherein the resin and/or the sheath and/or the core are comprised of at least one of the following:
thermoplastic material including at least one of the following: acrylics, fluorocarbons, polyamides, polyolefins, polyesters, polycarbonates, polyurethanes, polyaryletherketones, polyetherimides, polyethersulfone, polysulfone, and polyphenylsulfone;

thermosetting material including at least one of the following: polyurethanes, phenolics, polyimides, sulphonated polymer, a conductive polymer, benzoxazines, bismaleimides, cyanate esthers, polyesters, epoxies, and silsesquioxanes.

20. The injection moldable plastic of claim 17, wherein:
the polymer nanoparticles have a cross-sectional width of 10-200 nanometers.

21. The injection moldable plastic of claim 17, wherein:
at least some of the polymer nanoparticles have a cross-sectional width that is different than the cross-sectional width of other polymer nanoparticles in the resin mixture.

22. The injection moldable plastic of claim 17, wherein:
the polymer nanoparticles constitute no less than 10 percent by volume of the resin mixture and/or the polymer nanoparticles constitute up to 75 percent by volume of the resin mixture.

23. A method of manufacturing a composition, comprising:
mixing a plurality of polymer nanoparticles into a resin to form a resin mixture, at least some of the polymer nanoparticles are core-sheath nanoparticles that have a sheath encapsulating a core formed of insoluble material, the core of at least some of the core-sheath nanoparticles being a shaped particle having a non-spherical shape, at least some of the shaped particles each have at least one of the following shapes: oblong, elliptical, cylindrical, tubular, cubic, rectangular, pyramidal, bow tie, toroid, disk, jack, cross, star, dog bone, thin plate with triangle shape, thin plate with square shape, at least some of the shaped particles have the same non-spherical shape and each have a particle axis; and orienting the particle axes of the shaped particles parallel to each other within the resin mixture prior to or during curing or solidifying; and fully dissolving the sheath of the core-sheath nanoparticles in the resin prior to or during the curing or solidifying of the resin mixture in a manner such that the shaped particles remain oriented in a same direction after the resin mixture cures or solidifies.

24. The method of claim 23, wherein:
the sheath of the core-sheath nanoparticles is generally spherical prior to dissolution of the sheath.

25. The method of claim 23, wherein the resin and/or the sheath and/or the core are comprised of at least one of the following:

thermoplastic material including at least one of the following: acrylics, fluorocarbons, polyamides, polyolefins, polyesters, polycarbonates, polyurethanes, polyaryletherketones, polyetherimides, polyethersulfone, polysulfone, and polyphenyl sulfone;

thermosetting material including at least one of the following: polyurethanes, phenolics, polyimides, sulphonated polymer, a conductive polymer, benzoxazines, bismaleimides, cyanate esthers, polyesters, epoxies, and silsesquioxanes.

26. The method of claim 23, wherein:
the polymer nanoparticles have a cross-sectional width of 10-200 nanometers.

27. The method of claim 23, wherein:
the polymer nanoparticles constitute no less than 10 percent by volume of the resin mixture and/or the polymer nanoparticles constitute up to 75 percent by volume of the resin mixture.

\* \* \* \* \*